US011919136B2

(12) United States Patent
Zheng et al.

(10) Patent No.: US 11,919,136 B2
(45) Date of Patent: Mar. 5, 2024

(54) POWER TOOL

(71) Applicant: Nanjing Chervon Industry Co., Ltd., Nanjing (CN)

(72) Inventors: Chengyu Zheng, Nanjing (CN); Xiaoyong Wang, Nanjing (CN); Dinghao Jin, Nanjing (CN)

(73) Assignee: Nanjing Chevron Industry Co., Ltd., Nanjing (CN)

( * ) Notice: Subject to any disclaimer, the term of this patent is extended or adjusted under 35 U.S.C. 154(b) by 77 days.

(21) Appl. No.: 17/381,723

(22) Filed: Jul. 21, 2021

(65) Prior Publication Data

US 2022/0032440 A1 Feb. 3, 2022

(30) Foreign Application Priority Data

| | | |
|---|---|---|
| Jul. 28, 2020 | (CN) | 202010734873.0 |
| Oct. 16, 2020 | (CN) | 202011107080.2 |
| Oct. 16, 2020 | (CN) | 202011107373.0 |
| Nov. 11, 2020 | (CN) | 202011250107.3 |

(51) Int. Cl.
*B25F 5/00* (2006.01)
*B25F 5/02* (2006.01)

(52) U.S. Cl.
CPC ................ *B25F 5/001* (2013.01); *B25F 5/02* (2013.01)

(58) Field of Classification Search
CPC .. B05C 17/0103; B05C 17/0053; B05C 17/01
See application file for complete search history.

(56) References Cited

U.S. PATENT DOCUMENTS

2019/0314856 A1* 10/2019 Ho ...................... B05C 17/0103

* cited by examiner

*Primary Examiner* — Daniel Jeremy Leeds
(74) *Attorney, Agent, or Firm* — Greenberg Traurig, LLP

(57) ABSTRACT

A power tool includes a casing, an output mechanism, a motor, a leadscrew, a rotation assembly, a radial transmission assembly, an axial transmission assembly, and a torque transmission portion. The leadscrew extends along a front-and-back direction and is connected to the output mechanism. The rotation assembly is connected to the motor and is driven by the motor to rotate around the leadscrew. The radial transmission assembly is driven by the rotation assembly to rotate. The axial transmission assembly is separately connected to the radial transmission assembly and the leadscrew in a rotation manner and is configured to drive the leadscrew to move along an axial direction of the leadscrew. The torque transmission portion is disposed between the radial transmission assembly and the axial transmission assembly and is configured to transmit torque and cause the axial transmission assembly and the radial transmission assembly to rotate synchronously.

15 Claims, 15 Drawing Sheets

C-C

POWER TOOL

RELATED APPLICATION INFORMATION

This application claims the benefit under 35 U.S.C. § 119(a) of Chinese Patent Application No. 202010734873.0, filed on Jul. 28, 2020, Chinese Patent Application No. CN 202011107080.2, filed on Oct. 16, 2020, Chinese Patent Application No. CN 202011107373.0, filed on Oct. 16, 2020, and Chinese Patent Application No. CN 202011250107.3, filed on Nov. 11, 2020, which applications are incorporated by reference in their entirety herein.

BACKGROUND

An electric glue gun is generally configured in such a manner that a motor drives a leadscrew to rotate and the leadscrew is supported by a leadscrew nut to rotate and move along a straight line relative to the leadscrew nut so that the adhesive in a glue cylinder can be squeezed out and glue output can be achieved. However, the existing electric glue gun has a limited ability to withstand the load at an output end. As the load changes, the advancing speed of the leadscrew is likely to be uncontrollable. Especially when the load is relatively large, the leadscrew may easily slip relative to the leadscrew nut or even cannot advance so that glue output cannot be achieved. Therefore, the leadscrew in the existing art is prone to have an uncontrollable advancing speed or unable to advance as the load changes so that the electric glue gun outputs glue unsmoothly or cannot output glue.

SUMMARY

A power tool includes a casing; an output mechanism disposed at a front end of the casing; a motor configured to provide power for the output mechanism; a leadscrew extending along a front-and-back direction and connected to the output mechanism; a rotation assembly connected to the motor in the transmission manner and driven by the motor to rotate around the leadscrew; a radial transmission assembly driven by the rotation assembly to rotate; an axial transmission assembly separately connected to the radial transmission assembly and the leadscrew in a rotation manner and configured to drive the leadscrew to move along an axial direction of the leadscrew; and a torque transmission portion disposed between the radial transmission assembly and the axial transmission assembly and configured to transmit torque and cause the axial transmission assembly and the radial transmission assembly to rotate synchronously.

In some examples, the radial transmission assembly includes a first transmission sleeve and transmission teeth connected to the rotation assembly in the transmission manner and disposed on a radially outer side of the first transmission sleeve, and the torque transmission portion includes a first torque transmission portion disposed between the first transmission sleeve and the axial transmission assembly and configured to cause the first transmission sleeve and the axial transmission assembly to rotate synchronously.

In some examples, the first torque transmission portion includes several first non-circular portions disposed on an inner circumference of the first transmission sleeve and several second non-circular portions disposed on an outer circumference of the axial transmission assembly, where the second non-circular portions fit with the first non-circular portions.

In some examples, the axial transmission assembly includes a ball rack and balls, where the ball rack is connected to the first transmission sleeve in the transmission manner and sleeved on an outer circumference of the leadscrew, and a rack wall of the ball rack is provided with through holes through which the balls are allowed to pass.

In some examples, the radial transmission assembly further includes a second transmission sleeve, where the second transmission sleeve is sleeved on an outer circumference of the ball rack and provided with retention grooves on an inner circumferential wall of the second transmission sleeve, where the balls are allowed to enter the retention grooves.

In some examples, the torque transmission portion further includes a second torque transmission portion disposed between the second transmission sleeve and the axial transmission assembly and configured to cause the second transmission sleeve and the axial transmission assembly to rotate synchronously.

In some examples, the second torque transmission portion includes an anti-rotation pin, an installation hole disposed on the second transmission sleeve, and a pin groove disposed on the ball rack, where the pin groove extends along an axial direction of the ball rack.

In some examples, the second transmission sleeve is further provided with third non-circular portions on an outer circumference of the second transmission sleeve, where the third non-circular portions fit with the first non-circular portions so that the rotation of the second transmission sleeve relative to the first transmission sleeve is limited.

In some examples, each of the first non-circular portions is a plane disposed on the inner circumference of the first transmission sleeve, each of the second non-circular portions is a plane disposed on the outer circumference of the ball rack, and each of the third non-circular portions is a plane disposed on the outer circumference of the second transmission sleeve.

In some examples, the rotation assembly includes a driving gear and a sleeve, where the driving gear is disposed coaxially with the sleeve, the driving gear is connected to the motor in the transmission manner, and the sleeve is provided with transmission holes into which the transmission teeth are inserted.

In some examples, a clutch mechanism is further included, where the clutch mechanism is configured to drive the axial transmission assembly to move to a clutch position, and in the case where the axial transmission assembly is located at the clutch position, the balls are disengaged from the leadscrew.

In some examples, the clutch mechanism includes a movement assembly and a connection assembly, where the connection assembly is connected to the ball rack, the movement assembly is sleeved on the second transmission sleeve, and the movement assembly is configured to drive the connection assembly to drive the ball rack to move axially.

In some examples, the clutch mechanism further includes a trigger assembly, where the trigger assembly is configured to drive the movement assembly to move to the clutch position.

In some examples, the trigger assembly is a shift lever or a shift fork, where the shift lever or the shift fork is pivotally connected to the casing; and the connection assembly is an insertion piece that is clamped at an axial end of the ball rack.

In some examples, the output mechanism is a glue cylinder, and the power tool is a glue gun.

In some examples, an operation handle is further included, where the operation handle is disposed at a back end of the leadscrew.

In some examples, the output mechanism includes a container and a pushing rod assembly movable in the container, where the pushing rod assembly includes the leadscrew and a piston; the power tool further includes an actuator configured to drive the pushing rod assembly to move; and the power tool further includes an anti-failure mechanism detachably connected to the pushing rod assembly, where the anti-failure mechanism includes a cleaning tooth, and in the case where the anti-failure mechanism moves relative to the leadscrew, the cleaning tooth removes a residual adhesive on the leadscrew.

In some examples, the cleaning tooth is capable of being inserted into a thread root and configured to remove residual glue in the thread root.

In some examples, the anti-failure mechanism includes a plurality of cleaning teeth, where the plurality of cleaning teeth are arranged at intervals along the axial direction of the leadscrew.

In some examples, the anti-failure mechanism includes a plurality of cleaning teeth, where the plurality of cleaning teeth are spirally arranged at intervals on a cleaning member.

DETAILED DESCRIPTION

Figure 1:
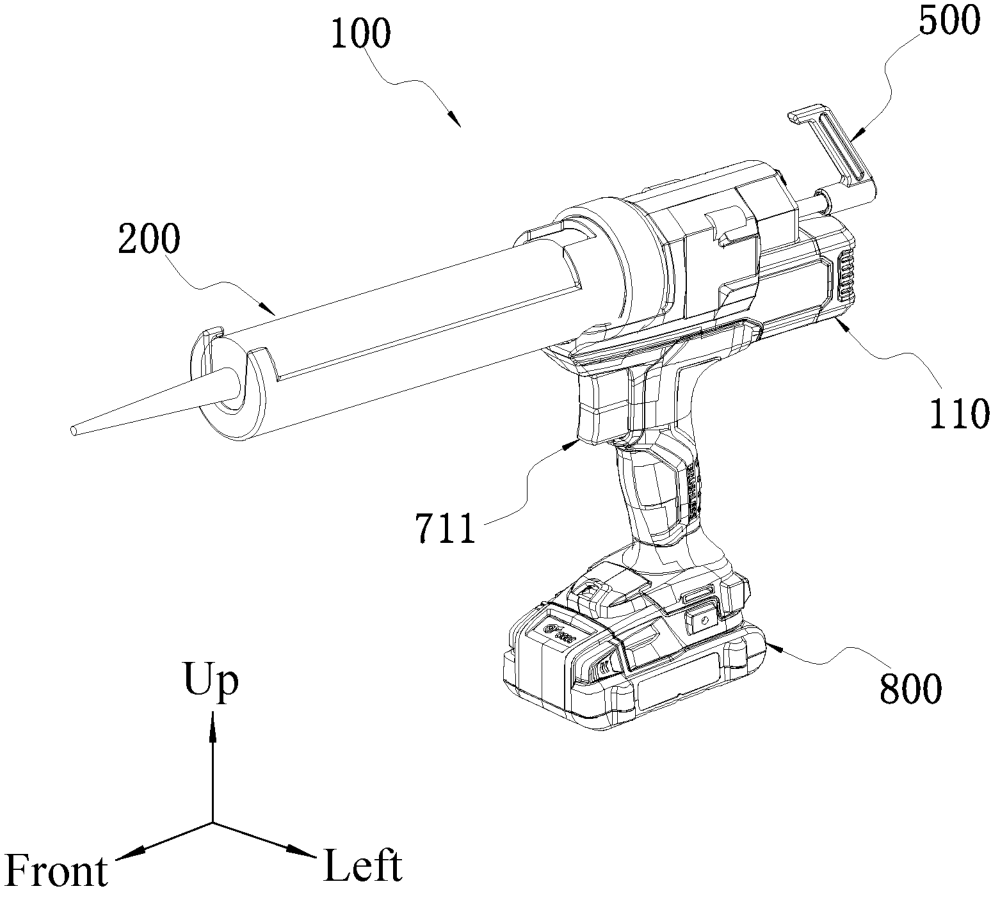
FIG. 1 is a structure view of a power tool according to the present disclosure.
Figure 2:
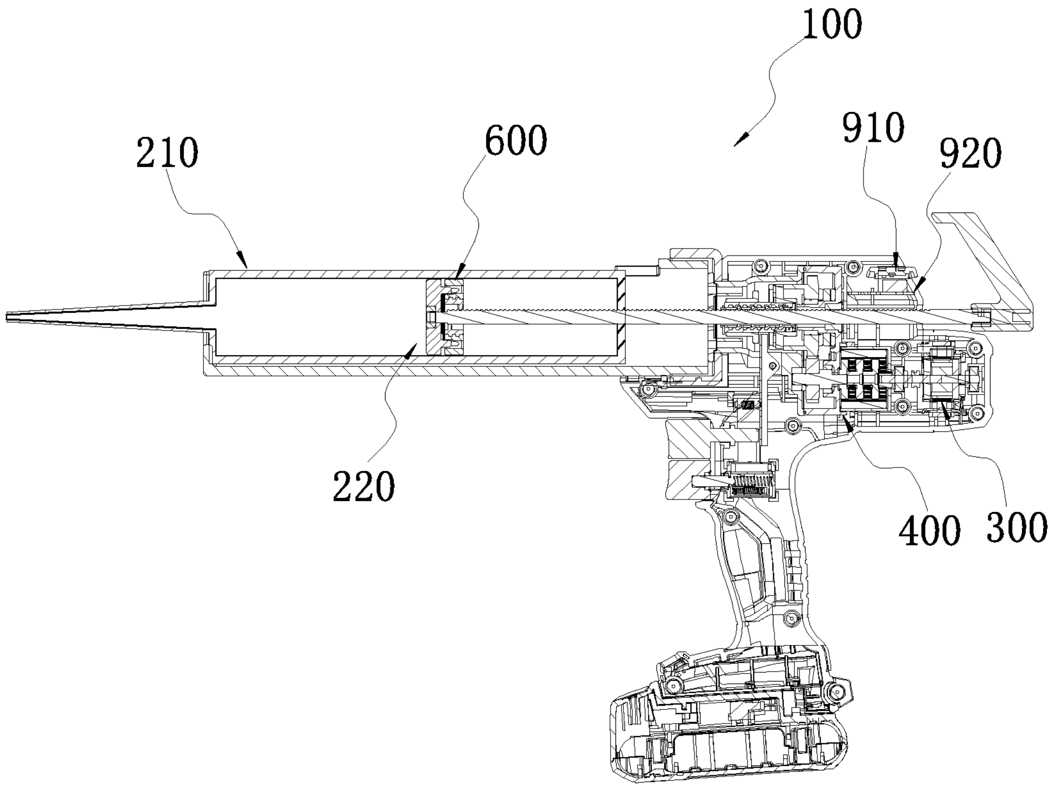
FIG. 2 is a sectional view of the power tool of FIG. 1 in a left-and-right direction.

FIGS. 1 and 2 show a glue gun 100 of the present disclosure and specifically an electric glue gun held by a hand for outputting glue. The glue gun is not limited to the electric glue gun and may also be a manual glue gun.

The glue gun 100 includes a casing 110, an output mechanism 200, an actuator 300, and a transmission mechanism 400.

Referring to FIG. 1, the output mechanism 200 is disposed at a front end of the casing 110, and the actuator 300 provides power for the output mechanism 200. The actuator 300 in examples of the present disclosure is specifically a motor 301.

Figure 3:
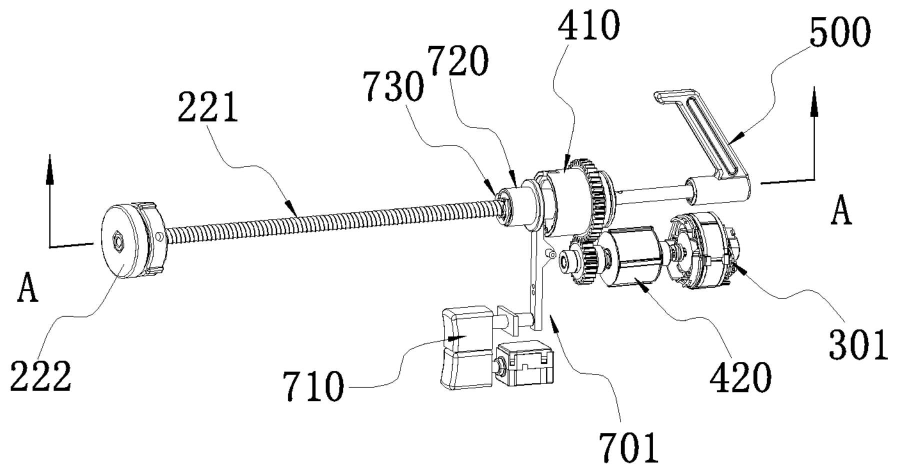
FIG. 3 is a schematic view of the assembly of a transmission mechanism, a clutch mechanism, and an actuator of FIG. 1.

As shown in FIGS. 1 to 3, the output mechanism 200 includes a glue container 210 and a pushing rod assembly 220 movable in the glue container 210, where the glue container 210 stores an adhesive therein, and the transmission mechanism 400 connects the motor 301 and the pushing rod assembly 220 in a transmission manner, where a piston 222 of the pushing rod assembly 220 is disposed in the glue container 210 and configured to move along an axial direction of the glue container 210 to squeeze the adhesive out and output glue.

Referring to FIG. 2, the pushing rod assembly 220 includes a leadscrew 221 and the piston 222. The leadscrew 221 extends along a front-and-back direction. The piston 222 is fixedly disposed at a front end of the leadscrew 221 and moves forward and backward along an axial direction of the leadscrew 221. An operation handle 500 is disposed at a back end of the leadscrew 221 and configured for a user to pull the leadscrew backward to an original position. The leadscrew 221 is connected to the motor 301 in the transmission manner through the transmission mechanism 400, and the leadscrew 221 is driven by the motor 301 to move forward and backward.

Referring to FIGS. 1 and 2, the electric glue gun in the examples of the present disclosure further includes a battery pack 800, a switch assembly 910, and a control mechanism 920. The battery pack 800 is configured to provide power for the motor. The control mechanism 920 is configured to control the motor 301 to operate. The switch assembly 910 in the examples of the present disclosure is a knob switch. The switch assembly 910 is connected to the motor 301 through the control mechanism 920. A knob may not only control the motor to be on or off through the control mechanism 920 but also adjust an output rotational speed. A speed regulation principle of the knob is the same as a speed regulation principle of the existing power tool and will not be repeated herein.

The transmission manner of the glue gun in this example is described below in conjunction with the drawings.

Figure 4:
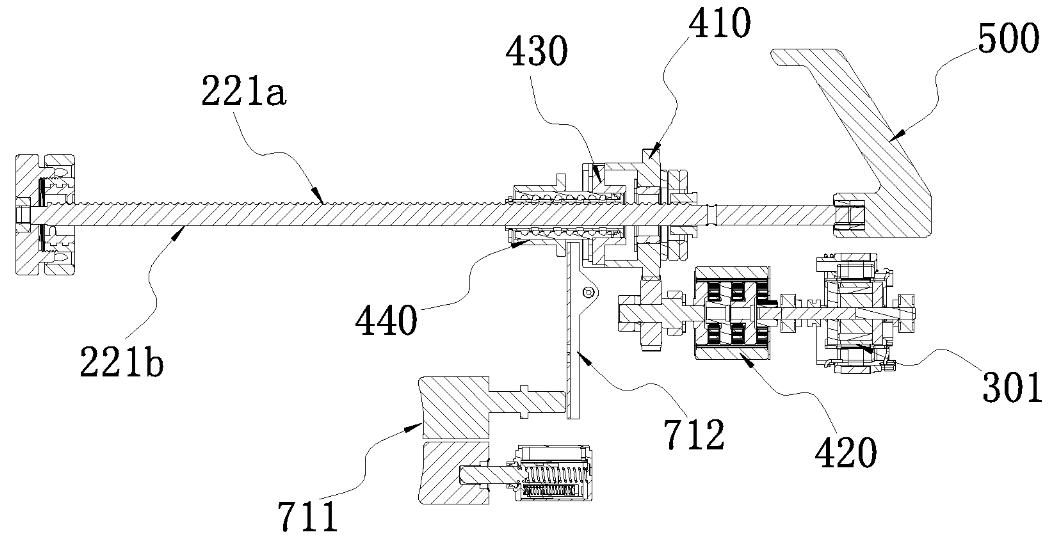
FIG. 4 is a sectional view of the power tool taken along a line A-A of FIG. 3.

Referring to FIGS. 3 and 4, the transmission mechanism 400 includes a rotation assembly 410, a gear box 420, and a transmission connection assembly, where the transmission connection assembly includes a radial transmission assembly 430 and an axial transmission assembly 440. The leadscrew 221 extends along the front-and-back direction, the gear box 420 is connected to the motor 301 in the transmission manner, and the motor 301 drives the rotation assembly 410 to rotate around the leadscrew 221.

Referring to FIG. 4, in this example, the radial transmission assembly 430 is driven to rotate by the rotation assembly 410, and the axial transmission assembly 440 is separately connected to the radial transmission assembly 430 and the leadscrew 221; the axial transmission assembly 440 is driven to rotate by the radial transmission assembly 430, and the rotation of the axial transmission assembly 440 drives the leadscrew 221 to translate forward and backward along the axial direction of the leadscrew 221.

As shown in FIGS. 3 to 8, the rotation assembly 410 includes a driving gear 412 and a sleeve 413, where the driving gear 412 and the sleeve 413 are coaxially disposed at an axial end of the rotation assembly 410. In this example, the driving gear 412 and the sleeve 413 are integrally formed, and the rotation assembly 410 is connected to the transmission mechanism 400 in the transmission manner. Specifically, the driving gear 412 is meshed with an output gear of the gear box, and the sleeve 413 is provided with transmission holes 411.

The radial transmission assembly 430 includes transmission teeth 431 and a first transmission sleeve 432, where the transmission teeth 431 are disposed on a radially outer side of the first transmission sleeve 432 and driven to rotate by the rotation assembly 410. Specifically, the transmission teeth 431 are inserted into the transmission holes 411 on the rotation assembly 410 and driven to rotate by the rotation assembly 410, and the axial transmission assembly 440 may be inserted into the first transmission sleeve 432 and slidably connected to an inner circumference of the first transmission sleeve 432 along an axial direction. In this example, the transmission teeth 431 and the first transmission sleeve 432 are integrally formed.

Figure 5:
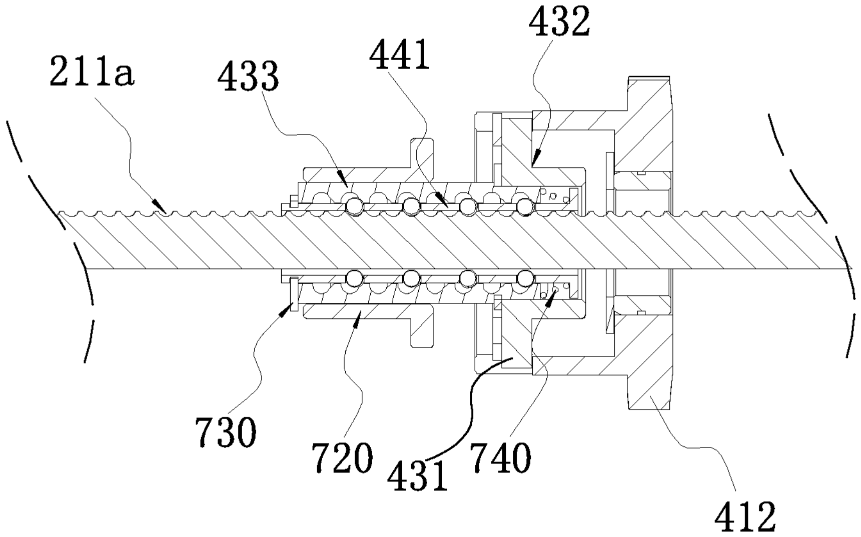
FIG. 5 is a schematic view of the operation of a partial area of FIG. 4.

The axial transmission assembly 440 includes a ball rack 441 and balls 444, where a sliding connection portion 442 is disposed at an axial end of the ball rack 441. In this example, the sliding connection portion 442 is an end plate integrally formed with the ball rack 441. The sliding connection portion 442 disposed at the axial end of the ball rack 441 is slidably connected to the first transmission sleeve 432. The ball rack 441 is cylindrical and sleeved on an outer circumference of the leadscrew 221. A rack wall of the ball rack 441 is provided with several through holes 443 arranged regularly, and the balls 444 are allowed to pass through the through holes 443. As shown in FIG. 5, in the case of a transmission connection, the balls 444 may pass through the through holes 443 to fit with thread grooves 221*a* on the leadscrew 221, the balls 444 are driven by the ball rack 441 to spirally roll around the leadscrew 221, and the rolling of the balls 444 drives the leadscrew 221 to move axially.

As shown in FIG. 4, in this example, the leadscrew 221 has a non-threaded guide plane 221*b*, where the guide plane 221*b* extends along the axial direction of the leadscrew; the glue gun 100 includes a guide sleeve that fits with the leadscrew 221, where the guide sleeve has a hole that fits with a cross-section of the leadscrew 221, thereby guiding the leadscrew 221 to move linearly along the axial direction of the leadscrew 221. The leadscrew 221 is configured to pass through the guide sleeve, and the guide plane 221*b* is provided to limit the leadscrew 221 to only translate forward or backward when driven by the rotation of the balls so that the adhesive can be squeezed out and the glue can be outputted.

In the examples of the present disclosure, the transmission mechanism 400 further includes a torque transmission portion disposed between the radial transmission assembly 430 and the axial transmission assembly 440 to ensure that the axial transmission assembly 440 and the radial transmission assembly 430 rotate synchronously, and the torque transmission portion includes a first torque transmission portion 1.

The first torque transmission portion 1 is disposed between the first transmission sleeve 432 and the axial transmission assembly 440 so that the first transmission sleeve 432 and the axial transmission assembly 440 rotate synchronously. Specifically, as shown in FIG. 8, the torque transmission portion includes several first non-circular portions 451 disposed on the inner circumference of the first transmission sleeve 432 and several second non-circular portions 452 disposed on an outer circumference of the sliding connection portion 442 of the ball rack 441, where the second non-circular portions 452 fit with the first non-circular portions 451.

Figure 7:
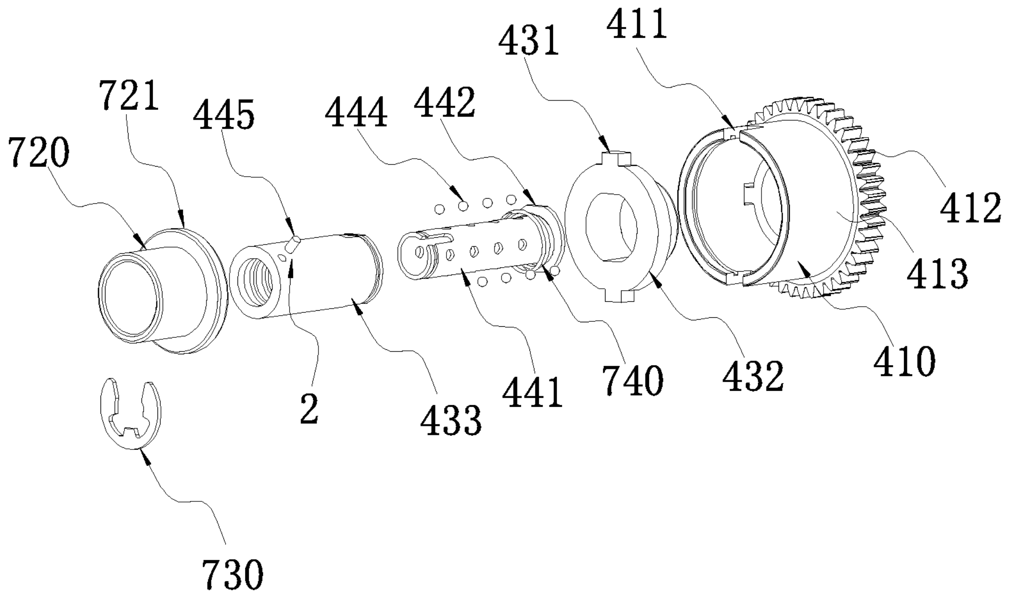
FIG. 7 is a schematic view of the assembly of a rotation assembly, a radial transmission assembly, and an axial transmission assembly in a transmission mechanism of a power tool according to the present disclosure.
Figure 8:
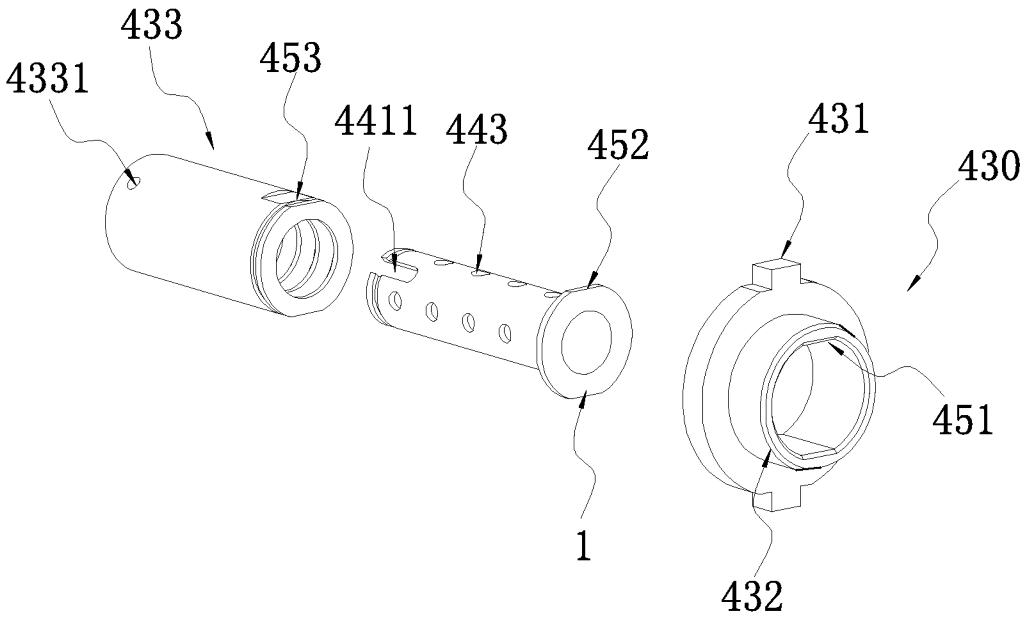
FIG. 8 is a schematic view of the assembly of a first transmission sleeve, a second transmission sleeve, and a ball rack in a transmission mechanism of a power tool according to the present disclosure.

Referring to FIGS. 7 and 8, in this example, each first non-circular portion 451 is a plane disposed on the inner circumference of the first transmission sleeve 432, each second non-circular portion 452 is a plane or a linear side disposed on the outer circumference of the sliding connection portion 442, two first non-circular portions 451 and two second non-circular portions 452 are respectively provided, and each first non-circular portion 451 is suitable for being inserted and sleeved on an outer circumference of a respective second non-circular portion 452. The first non-circular portions 451 and the second non-circular portions 452 are provided to limit the rotation of the ball rack 441 relative to the first transmission sleeve 432 so that it is ensured that the ball rack 441 and the first transmission sleeve 432 always rotate synchronously, and the following case can be avoided: the radial transmission assembly 430 and the ball rack 441 slip from each other due to the relative rotation of the radial transmission assembly 430 relative to the ball rack 441. In this manner, it is further ensured that the leadscrew always moves smoothly and the glue is outputted more smoothly and evenly.

Figure 6:
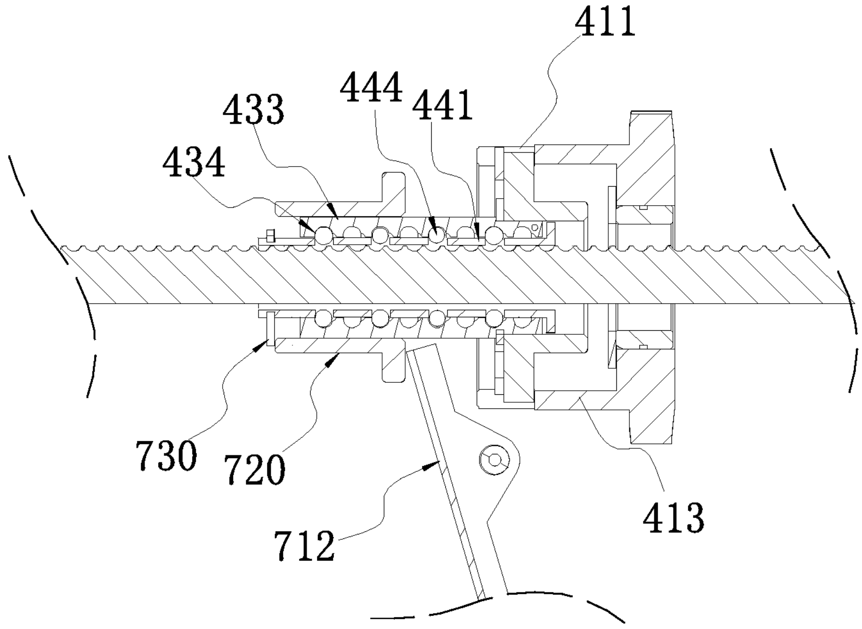
FIG. 6 is a schematic view of the operation of the partial area of FIG. 4 in a clutch position.

As shown in FIGS. 7 and 8, in the examples of the present disclosure, the radial transmission assembly 430 further includes a second transmission sleeve 433, where the second transmission sleeve 433 is sleeved on a cylindrical outer circumference of the ball rack 441. Referring to FIG. 5, the second transmission sleeve 433 is provided with retention grooves 434 on an inner circumferential wall of the second transmission sleeve 433, where the balls 444 are allowed to enter the retention grooves 434. During a normal operation, the balls 444 are embedded in the ball rack 441 and may roll around the thread grooves 221*a* on a surface of the leadscrew 221. Referring to FIG. 6, when the ball rack 441 moves along an axial direction of the ball rack 441, the balls 444 are pushed by the ball rack 441 into the retention grooves 434 of the second transmission sleeve 433. At this time, since the balls 444 are disengaged from the leadscrew 221 and the ball rack 441, the leadscrew 221 may move freely and axially relative to the ball rack 441.

Referring to FIG. 7, in this example, the torque transmission portion further includes a second torque transmission portion 2 disposed between the second transmission sleeve 433 and the axial transmission assembly 440 so that the second transmission sleeve 433 and the axial transmission assembly 440 rotate synchronously, where the second torque transmission portion 2 includes an anti-rotation pin 445, an installation hole 4331 disposed on the second transmission sleeve 433, and a pin groove 4411 disposed on the ball rack 441, where the pin groove 4411 extends along the axial direction of the ball rack 441.

Specifically, referring to FIGS. 7 and 8, the pin groove 4411 extending along the axial direction of the ball rack 441 is further provided on a surface of the ball rack 441, the installation hole 4331 is further provided on a surface of the second transmission sleeve 433, and the anti-rotation pin 445 is installed in the installation hole 4331 and may be slidably connected to the pin groove 4411 along the axial direction. The pin groove 4411 and the anti-rotation pin 445 are provided to limit the relative rotation of the second transmission sleeve 433 and the ball rack 441 and allow the ball rack 441 to move axially relative to the second transmission sleeve 433.

Referring to FIGS. 5 and 8, in the examples of the present disclosure, the second transmission sleeve 433 is further provided with third non-circular portions 453 on an outer circumference of the second transmission sleeve 433, where the third non-circular portions 453 fit with the first non-circular portions 451 on the inner circumference of the first transmission sleeve 432. In this manner, the relative rotation of the second transmission sleeve 433 relative to the first transmission sleeve 432 is limited and thus the second transmission sleeve 433 and the first transmission sleeve 432 rotate synchronously. Therefore, the reliability of transmission is ensured, and the smooth movement and output of the leadscrew are further ensured.

As an alternative example, the first non-circular portions 451, the second non-circular portions 452, and the third non-circular portions 453 may also be configured as other non-planar fitting structures such as a protrusion and a groove that fit with each other or a convex curved surface and a concave curved surface that fit with each other.

As an alternative example, the second transmission sleeve 433 may also be integrally formed with the first transmission sleeve 432.

In this example, the leadscrew 221 is connected to the balls 444 in the axial transmission assembly 440 in the transmission manner to move linearly and axially. However, in a working process of the glue gun, it is difficult to prevent the adhesive in the glue container from sticking to the leadscrew so that the surface of the leadscrew 221 is covered by the adhesive, the balls 444 cannot be connected to the leadscrew 221 in the transmission manner, the leadscrew 221 cannot move normally, and finally the glue gun cannot output the glue.

Therefore, to avoid a failure of the glue gun, as shown in FIGS. 2 and 11 to 14, the glue gun 100 in the examples of the present disclosure further includes an anti-failure mechanism 600 configured to remove a residual adhesive on the surface of the leadscrew 221.

Figure 9:
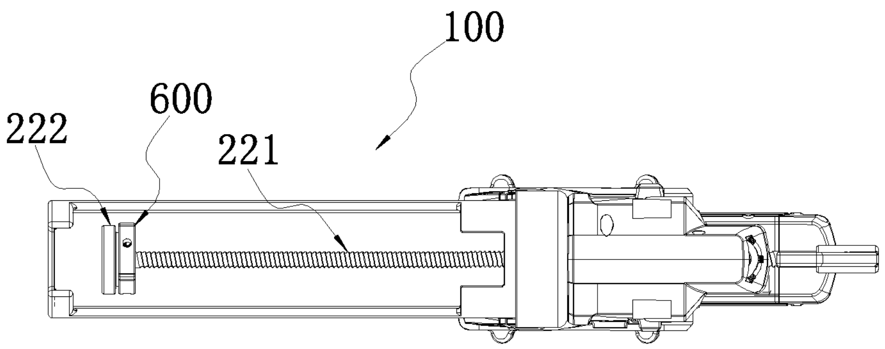
FIG. 9 is a schematic view of a non-working state of an anti-failure mechanism fixed to a piston of a power tool according to the present disclosure.
Figure 10:
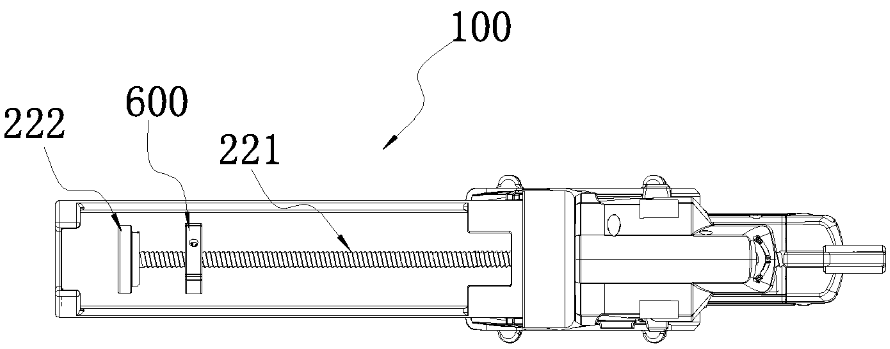
FIG. 10 is a schematic view of a working state of an anti-failure mechanism of a power tool according to the present disclosure.
Figure 11:
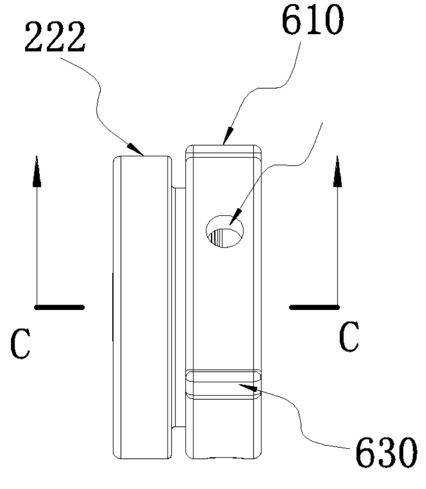
FIG. 11 is a structure view of an anti-failure mechanism of a power tool according to the present disclosure.

The anti-failure mechanism 600 is detachably connected to the pushing rod assembly 220. Specifically, in this example, the anti-failure mechanism 600 includes a main body 610 and a cleaning member 620, where the main body 610 is detachably connected to the pushing rod assembly 220, and the cleaning member 620 is detachably connected to the main body 610. The main body 610 includes a non-working state in which the main body 610 is stationary relative to the leadscrew 221 as shown in FIG. 9 and a working state in which the main body 610 moves relative to the leadscrew 221 as shown in FIG. 10.

Figure 12:
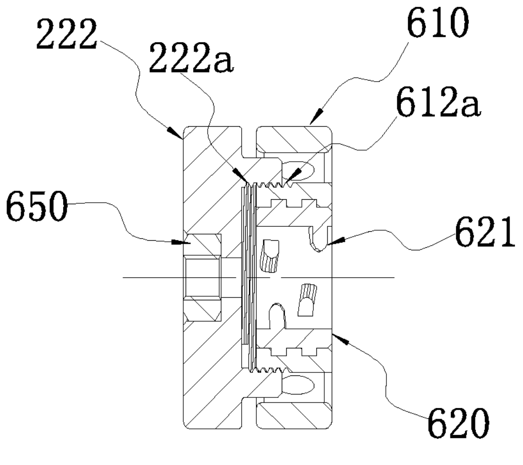
FIG. 12 is a sectional view taken along a line C-C of FIG. 11.
Figure 16:
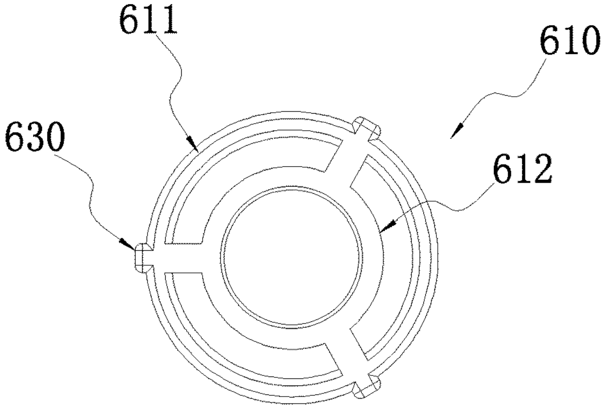
FIG. 16 is a structure view of a main body of an anti-failure mechanism according to the present disclosure.
Figure 17:
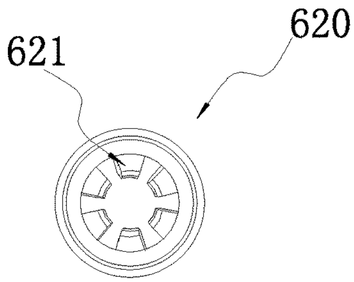
FIG. 17 is a structure view of a cleaning member of an anti-failure mechanism according to the present disclosure.

As shown in FIGS. 12, 16, and 17, in this example, the main body 610 and the cleaning member 620 are both annular members, the cleaning member 620 is connected to a radial inner side of the main body 610, and the cleaning member 620 is disposed on the radial inner side of the main body 610.

The main body 610 and the cleaning member 620 of the anti-failure mechanism 600 may also be integrally formed, which is not limited.

Figure 13:
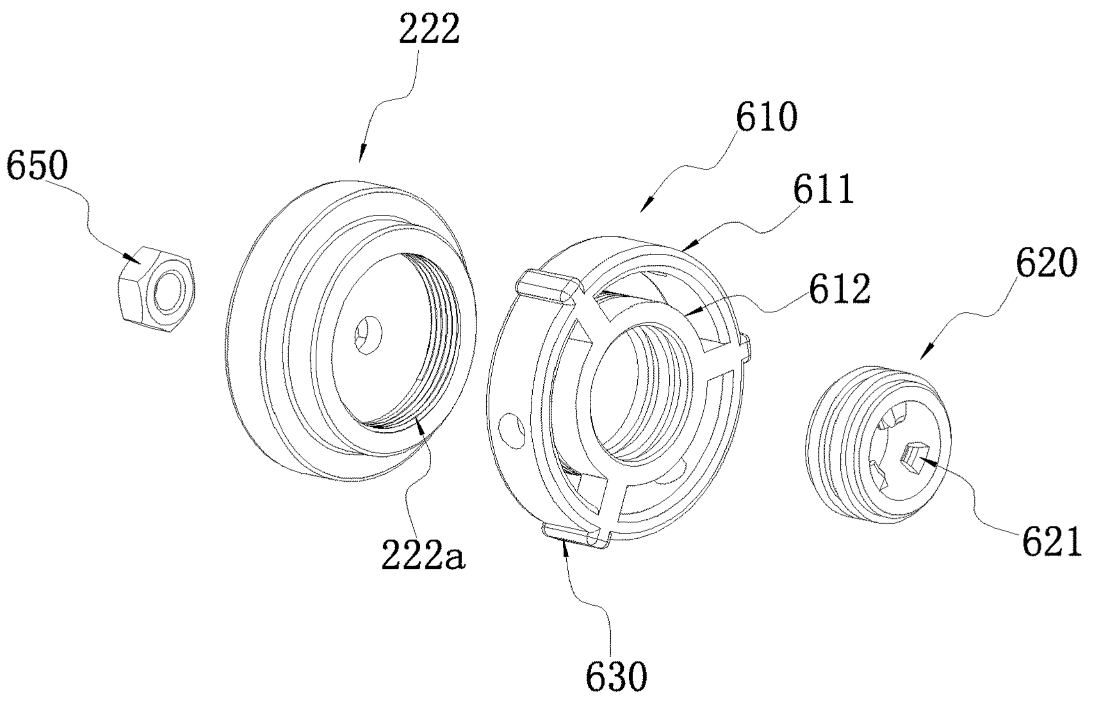
FIG. 13 is a schematic view of the assembly of an anti-failure mechanism of a power tool according to the present disclosure.

Specifically, as shown in FIG. 13, in this example, the main body 610 includes an outer main body 611 and an inner main body 612 that are coaxially disposed, where the inner main body 612 is connected to a radial inner side of the outer main body 611. In this example, the inner main body 612 and the outer main body 611 are integrally formed.

The main body 610 is detachably connected, for example, threadedly connected or clamped, to the piston 222. In this example, the main body 610 is threadedly connected to the piston 222. The cleaning member 620 is configured to remove the residual adhesive on the leadscrew 221 when the main body 610 moves relative to the leadscrew 221.

Figure 14:
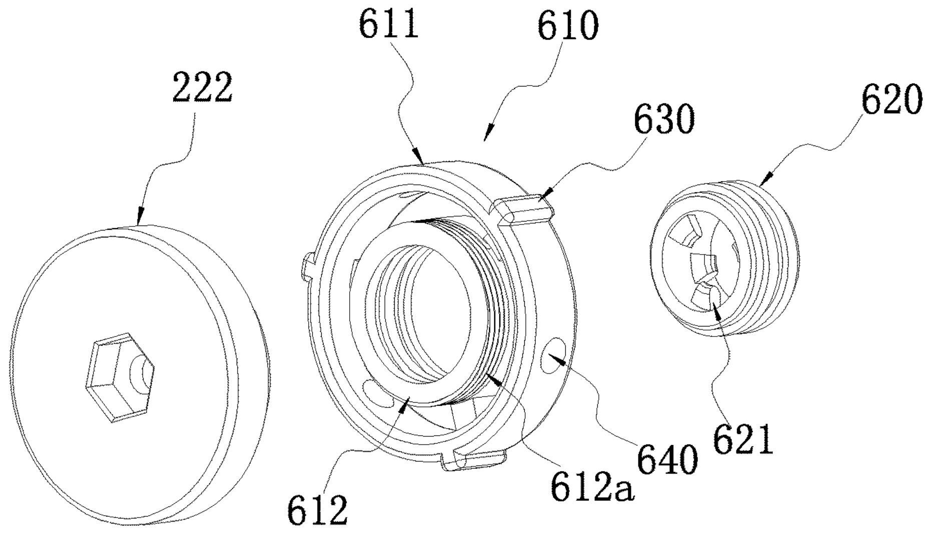
FIG. 14 is a schematic view of the assembly of an anti-failure mechanism of a power tool from another viewing angle according to the present disclosure.
Figure 15:
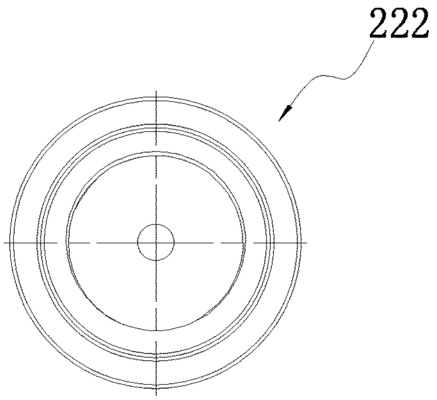
FIG. 15 is a structure view of a piston of a power tool according to the present disclosure.

Specifically, as shown in FIGS. 13 and 14, external threads 612*a* are disposed at an axial end of the inner main body 612. The external threads 612*a* may be disposed at two axial ends of the inner main body 612. Correspondingly, internal threads 222*a* that fit with the external threads 612*a* are disposed at an axial end of the piston 222 closer to the transmission mechanism, and the internal threads 222*a* and the external threads 612*a* are configured to connect the piston 222 and the main body 610. Threads on the main body 610 rotate in the same direction as threads on the leadscrew 221. Specifically, in this example, the external threads 612*a* on the inner main body 612 rotate in the same direction as threads on the surface of the leadscrew 221. In this manner, it can be ensured that when the main body 610 is screwed onto the piston 222, the anti-failure mechanism 600 is screwed along the leadscrew 221 toward an axial front end of the leadscrew 221; when the main body 610 is screwed off the piston 222, the anti-failure mechanism 600 is screwed along the leadscrew 211 toward an axial back end of the leadscrew 221. At this time, the anti-failure mechanism 600 may be screwed continuously to remove the residual glue.

The cleaning member 620 may also be detachably connected to the piston 222. For example, threads are disposed at the axial end of the cleaning member 620 so that the cleaning member 620 is detachably connected to the piston 222 and the anti-failure mechanism 600 is detachably connected to the piston 222.

As shown in FIG. 12, in this example, the cleaning member 620 is clamped to the main body 610. Specifically, a clamping groove and/or flange is disposed on an outer circumferential surface of the cleaning member 620, a flange and/or clamping groove is disposed on an inner circumferential surface of the inner main body 612, and the flange is clamped in the clamping groove so that the cleaning member 620 and the main body 610 are fixed relative to each other.

As an alternative example, the cleaning member 620 may also be threadedly connected to the main body 610. For example, external threads are disposed on the outer circumferential surface of the cleaning member 620, and internal threads that fit with the external threads are disposed on the inner circumferential surface of the inner main body 612.

As shown in FIGS. 12 and 17, the cleaning member 620 includes a cleaning tooth 621 that fits with the threads on the surface of the leadscrew 221. When the main body 610 rotates relative to the leadscrew 221, the cleaning tooth 621 rotates synchronously. The cleaning tooth 621 rotates relative to the threads on the leadscrew so that the residual adhesive sticking to the threads on the leadscrew is removed and the following case can be avoided: the failure occurs due to the residual adhesive in the threads on the leadscrew in a process of the leadscrew 221 fitting with the transmission mechanism 400.

At least the cleaning tooth 621 is a metal member. In this example, the cleaning member 620 is a metal member and the main body 610 is a plastic member so that the overall weight of the anti-failure mechanism 600 is reduced.

The cleaning tooth 621 and the cleaning member 620 may also be hard plastic members. In other words, the anti-failure mechanism 600 may be a plastic member integrally formed by the cleaning member 620 and the main body 610, or the anti-failure mechanism 600 may also be a metal member integrally formed by the main body 610 and the cleaning member 620, which is not limited.

Specifically, referring to FIG. 12, in this example, the cleaning tooth 621 on the cleaning member 620 is suitable for being inserted into a thread root of the leadscrew 221 to remove residual glue in an interval between threads.

Each cleaning member 620 may be provided with one cleaning tooth 621 or may be provided with multiple cleaning teeth 621.

When multiple cleaning teeth 621 are provided, the multiple cleaning teeth 621 may be arranged at intervals along the axial direction of the leadscrew 221. For example, two or three cleaning teeth 621 may be arranged at intervals along the axial direction of the leadscrew 221. The number of the cleaning teeth 621 is not limited to two or three, and any number of cleaning teeth 621 may be arranged.

Optionally, multiple cleaning teeth 621 are arranged on an inner circumferential surface of the cleaning member 620 at intervals generally along a spiral direction.

The anti-failure mechanism with the cleaning tooth is provided to rotate relative to the leadscrew so that the residual adhesive between the threads on the leadscrew is removed. The anti-failure mechanism has a simple structure, can be used repeatedly, has a relatively low cost, and is conducive to improving the service life of the glue gun and user experience.

Optionally, cleaning members 620 may constitute an assembly. For example, a cleaning assembly includes multiple cleaning members 620 that are replaceable or fit with each other, where the cleaning teeth 621 disposed on different cleaning members 620 are suitable for leadscrews 221 with different minor diameters dl. In other words, the cleaning teeth 621 on different cleaning members 620 are suitable for cleaning leadscrews of different dimensions, where the minor diameter dl refers to a diameter of an imaginary cylinder tangent to roots of external threads.

The cleaning assembly with multiple cleaning members 620 is provided so that the adaptability of the cleaning members 620 can be improved, and thus the cleaning members 620 are suitable for leadscrews 221 of different specifications. It is to be understood that the cleaning member with the cleaning tooth that fit with the dimension of the leadscrew 221 may be selected to clean glue, and other unused cleaning assemblies may be stored separately.

As shown in FIGS. 13 and 14, in this example, the anti-failure mechanism 600 further includes an auxiliary operation portion 630, where the auxiliary operation portion 630 includes lugs or ribs disposed on an outer circumferential surface of the main body 610 and gripped by the user for a forced to be exerted when the user performs a rotation operation. As an alternative example, the auxiliary operation portion 630 may also include a rough surface disposed on the outer circumferential surface of the main body 610 to increase the friction when the user performs the rotation operation, which is convenient for the user to rotate the anti-failure mechanism 600.

Referring to FIGS. 13 and 14, in this example, the anti-failure mechanism 600 further includes a torque amplification hole 640 disposed on the outer circumferential surface of the main body 610. Specifically, the torque amplification hole 640 is a circular hole into which a torque amplification member is allowed to be inserted, where the torque amplification member may be any stick-like object that the user can acquire at hand such as a stick, a rod, or a screwdriver. The user inserts the torque amplification member into the torque amplification hole 640 and then easily rotates the anti-failure mechanism 600 by rotating the torque amplification member. In this manner, the user can easily rotate the anti-failure mechanism 600 for glue cleaning just with a smaller force, and the following case can be avoided: when the cleaning tooth encounters the glue on the surface of the leadscrew, the user needs to take a lot of efforts to rotate the anti-failure mechanism for rotation and cleaning.

In this example, how to use the anti-failure mechanism 600 is described below.

It is to be understood that in this example, the anti-failure mechanism 600 may be threadedly connected to the piston 222 when not in use so that the anti-failure mechanism 600 and the piston 222 form a whole in which the anti-failure mechanism 600 and the piston 222 are fixed relative to each other and thus are stored in the glue gun.

When the glue in the glue container 210 is used up, after the user takes out the glue container 210 or during the replacement of the glue container 210 (that is, after the glue container used up is removed and before a new glue container is installed), the anti-failure mechanism 600 may be used to remove the residual adhesive on the leadscrew 221. The anti-failure mechanism 600 may be rotated to be screwed off the piston 222 and move along the leadscrew 221 toward the axial back end of the leadscrew 221, and the main body 610 rotates to drive the cleaning tooth 621 on the cleaning member 620 to move along thread grooves on the leadscrew 221 so that the glue cleaning is achieved.

After the glue cleaning is completed, the user rotates the anti-failure mechanism 600 along a reverse direction, and the anti-failure mechanism 600 moves along the leadscrew 221 toward the axial front end of the leadscrew 221 and is finally screwed onto the piston 222 so that the anti-failure mechanism 600 is withdrawn and stored.

In this example, the preceding anti-failure mechanism 600 is provided with the threads to be detachably connected to the piston and can be detached from the piston and implement the glue cleaning operation simultaneously through one-way rotation; correspondingly, the anti-failure mechanism 600 can move forward along the leadscrew and be fixedly connected to the piston through reverse one-way rotation. The preceding method is simple and convenient in operation, and the user does not need to use an additional independent component for glue cleaning. The anti-failure mechanism 600 is detachably connected to the piston 222, avoiding the redundancy of accessories and further avoiding the loss of an accessory. On the other hand, the glue removal operation can be easily and conveniently achieved without disassembling the main device, which is conducive to improving the user experience.

As an alternative example, the anti-failure mechanism 600 may further include several replaceable auxiliary cleaning members, which have the same structure as the cleaning member 620, and the auxiliary cleaning member is provided with an auxiliary cleaning tooth. The difference between the auxiliary cleaning member and the cleaning member 620 is that the auxiliary cleaning tooth fits with a thread crest of the leadscrew 221 for removing residual glue on the thread crest. It is to be understood that these auxiliary cleaning members are all stored separately and in the case of glue cleaning, the cleaning tooth and the cleaning member that fit with the dimension of the leadscrew 221 may be selected to be installed on the leadscrew for the glue cleaning operation.

As an alternative example, the cleaning member may be provided with a main cleaning tooth and an auxiliary cleaning tooth, where the main cleaning tooth fits with the thread root and the auxiliary cleaning tooth fits with the thread crest.

As another alternative example, the cleaning tooth on the cleaning member 620 may also be a V-shaped tooth that fits with a thread. Specifically, a V-shaped groove is provided at the top of the cleaning tooth 621, and the V-shaped groove is suitable for fitting with the thread on the leadscrew and may cover an outer surface of the thread so that the residual adhesive on both the thread crest and the thread root can be removed simultaneously.

The anti-failure mechanism 600 may not be fixed to the piston 222 when not in use, and the anti-failure mechanism 600 may be stored separately as an accessory according to a choice of the user and may be installed on the leadscrew 221 only in need. When the anti-failure mechanism 600 is installed, a fixing nut 650 at the axial end of the piston 222 is disassembled, the piston 222 is taken off, and the anti-failure mechanism 600 is sleeved on the leadscrew 221 and removes the residual adhesive spirally along the leadscrew 221; after the removal is completed, the anti-failure mechanism 600 may be screwed out, and then the piston 222 and the nut 650 are installed.

As an alternative example, the anti-failure mechanism 600 is also suitable for a manual glue gun that uses a leadscrew to push glue. As long as the glue gun uses a pushing rod mechanism that includes a leadscrew, the anti-failure mechanism in this example is suitable, which is not limited.

The electric glue gun 100 of the present disclosure further includes a clutch mechanism 701, where the clutch mechanism 701 is configured to drive the ball rack 441 to move along the axial direction of the leadscrew 221 to a clutch position, where in the case where the ball rack 441 is at the clutch position, the balls 444 are pushed into the retention grooves 434 of the second transmission sleeve 433 and disengaged from the leadscrew 221. At this time, the leadscrew may move freely and axially relative to the ball rack.

Referring to FIGS. 3 to 6, the clutch mechanism 701 includes a trigger assembly 710, a movement assembly 720, and a connection assembly 730, where the trigger assembly 710 is configured to drive the movement assembly 720 to move to the clutch position, the connection assembly 730 is connected to the ball rack 441, the movement assembly 720 is sleeved on the second transmission sleeve 433, and the movement assembly 720 drives the connection assembly 730 to drive the ball rack 441 to move axially.

Specifically, referring to FIGS. 5 and 7, the movement assembly 720 is a cylindrical structure that is sleeved on the second transmission sleeve 433, the movement assembly 720 is provided with a flange 721 that protrudes along a radial direction of the movement assembly 720 and is convenient for the trigger assembly 710 to trigger, and the connection assembly 730 is a connection piece that is clamped at the axial end of the ball rack 441. As shown in FIG. 7, in this example, the connection assembly 730 is a U-shaped insertion piece that is clamped at the axial end of the ball rack 441. As shown in FIGS. 3 and 4, the trigger assembly 710 includes a trigger button 711 and a shift lever 712, where a middle of the shift lever 712 is pivotally connected to the casing 110, a lower end of the shift lever 712 is provided with the button 711, and an upper end of the shift lever 712 is disposed at an axial back end of the flange 721 (that is, the right side of FIG. 6).

In the examples of the present disclosure, to automatically reset the clutch mechanism 701, a spring 740 configured to drive the ball rack 441 to return to an original position is further provided. As shown in FIGS. 5 and 7, the spring 740 is disposed between the sliding connection portion 442 of the ball rack 441 and an axial end of the second transmission sleeve 433 and configured to drive the ball rack 441 to return to the original position.

During the normal operation, referring to FIG. 5, the motor 301 drives the rotation assembly 410 to rotate so that the first transmission sleeve 432 is driven to rotate, and the first transmission sleeve 432 drives the ball rack 441 and the second transmission sleeve 433 to rotate synchronously with the first transmission sleeve 432 through the first non-circular portions 451 on the inner circumference of the first transmission sleeve 432.

At this time, the balls 444 are embedded in the through holes 443 of the ball rack 441 and driven by the ball rack 441 to roll around the thread grooves 221*a* on the outer circumference of the leadscrew 221 so that the leadscrew 221 is driven to translate along the axial direction of the leadscrew 221 and thus glue is outputted.

In the case of replacing the glue container, referring to FIG. 6, when the leadscrew 221 advances to an extreme position, the leadscrew needs to retreat and be reset, and a new glue container needs to be installed. At this time, the motor is controlled by a knob to stop rotating, the user presses the button 711, and the movement assembly 720 is driven by the shift lever 712 to drive the ball rack 441 through the connection assembly 730 to move to the axial front end. At this time, the balls 444 are pushed by the ball rack 441 into the retention grooves 434 of the second transmission sleeve 433 and disengaged from the thread grooves 221*a* on the surface of the leadscrew 221.

Then, the user pulls the operation handle 500 so that the leadscrew 221 retreats backward. Before the leadscrew 221 retreats backward, the anti-failure mechanism 600 may be rotated to perform the glue cleaning operation on the leadscrew 211.

Thereafter, the user releases the button 711, the shift lever 712 is reset under the action of the spring, and the spring 700 exerts a force on the ball rack 441 so that the ball rack 441 moves toward the axial back end to the original position. The ball rack 441 drives the movement assembly 720 to return to the original position. In this manner, the ball rack 441 and the clutch mechanism are reset.

Figure 18:
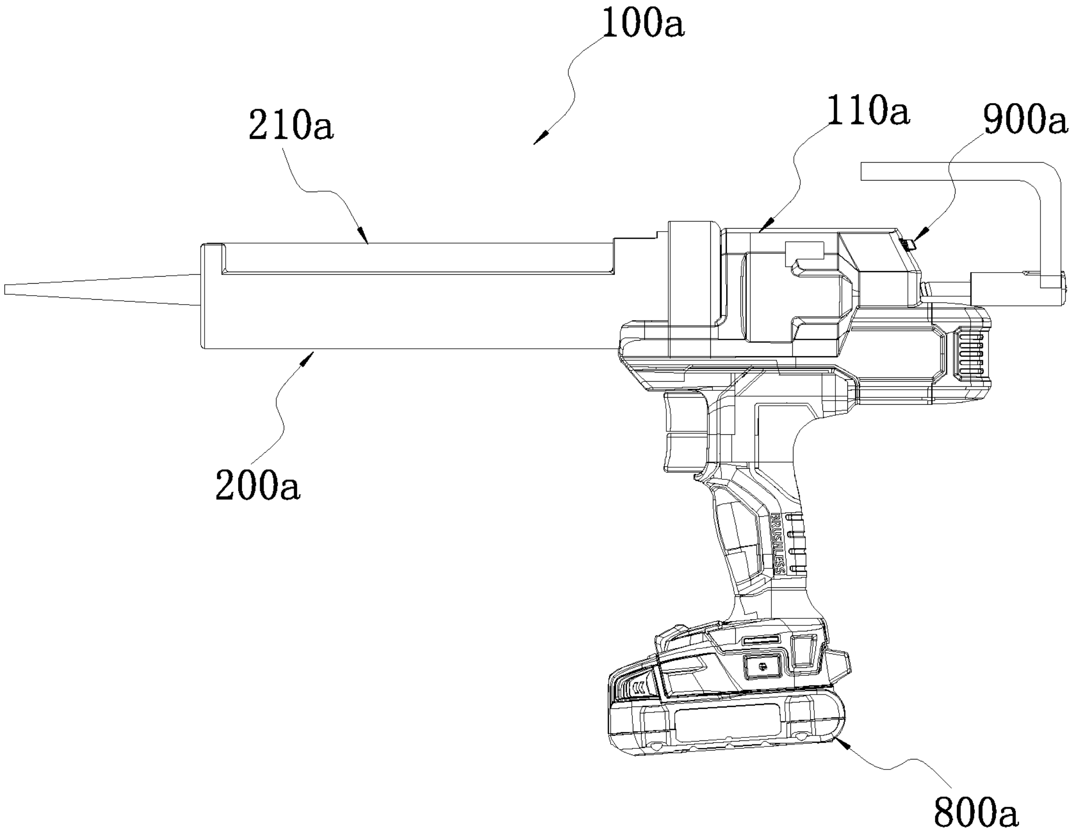
FIG. 18 is a front view of an electric glue gun according to the present disclosure.
Figure 19:
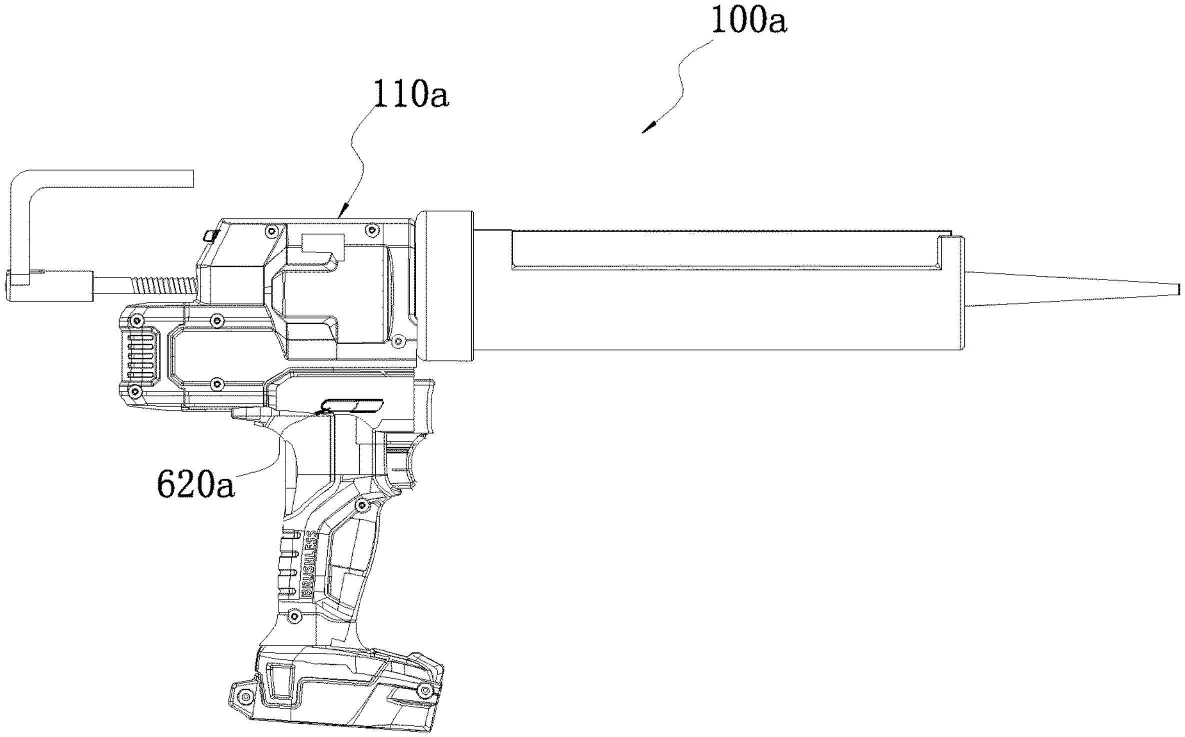
FIG. 19 is a rear view of the electric glue gun of FIG. 18.
Figure 20:
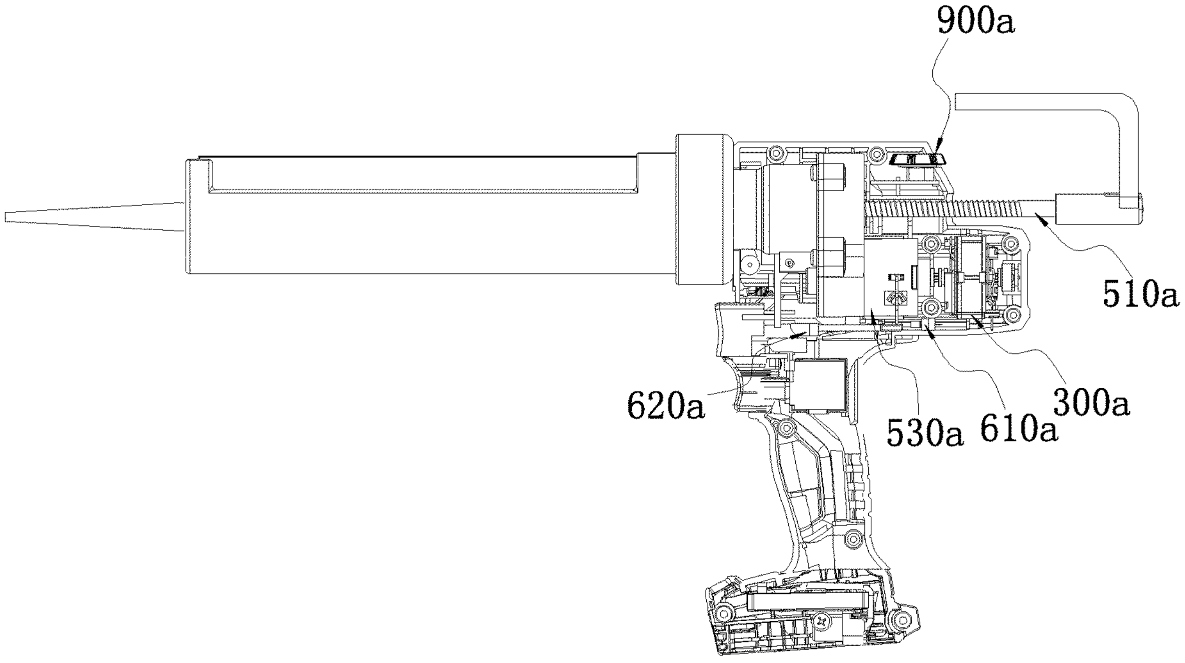
FIG. 20 is a front view of the electric glue gun of FIG. 18 with a casing opened.

FIGS. 18 to 20 show an electric glue gun 100*a* provided in another example of the present disclosure. The electric glue gun 100*a* is configured to be held by a hand for outputting glue. The glue gun 100*a* includes a casing 110*a*, an output mechanism 200*a*, a power mechanism 300*a*, a control mechanism 400*a*, and a transmission mechanism.

Referring to FIG. 18, the output mechanism 200*a* is disposed at a front end of the casing 110*a*, the transmission mechanism connects a motor 301*a* and the output mechanism 200*a* in a transmission manner, and the output mechanism 200*a* includes a glue container 210*a*, where the glue container 210*a* stores an adhesive therein. The power mechanism 300*a* provides power for the electric glue gun 100*a*, and the power mechanism 300*a* in examples of the present disclosure is specifically a motor.

Figure 21:
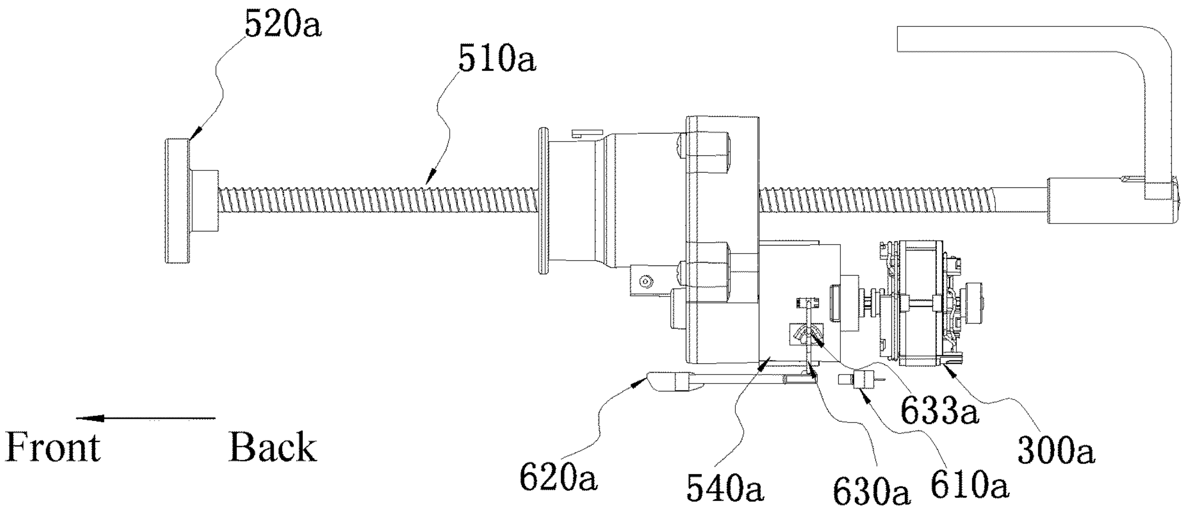
FIG. 21 is a schematic view illustrating that a transmission mechanism fits with a state switching mechanism according to an example of the present disclosure.

Referring to FIG. 21, the transmission mechanism includes a pushing rod assembly. In this example, the pushing rod assembly includes a leadscrew 510*a* and a pushing plate 520*a*, where the leadscrew 510*a* extends along a front-and-back direction, and the leadscrew 510*a* is connected to the output mechanism 200*a*. Specifically, the pushing plate 520*a* is fixedly disposed at a front end of the leadscrew 510*a*, and the pushing plate 520*a* moves forward and backward along an axial direction with the leadscrew 510*a*. During a normal gluing operation, the pushing rod assembly advances; in the case where a pushing rod needs to be reset and the glue container needs to be replaced, the pushing rod assembly retreats backward to an original position.

As shown in FIG. 21, in this example of the present disclosure, the transmission mechanism connects the motor and the pushing rod assembly in the transmission manner, where a shift assembly 530*a* has different transmission states in which the pushing rod assembly outputs different speeds. Specifically, the shift assembly includes a first transmission state and a second transmission state, where in the first transmission state, the shift assembly 530*a* drives the pushing rod assembly to output a first speed, and in the second transmission state, the shift assembly 530*a* drives the pushing rod assembly to output a second speed, where the second speed is higher than the first speed. In other words, the shift assembly 530*a* can change the output speed of the pushing rod assembly by changing the transmission state of the shift assembly 530*a*.

Figure 22:
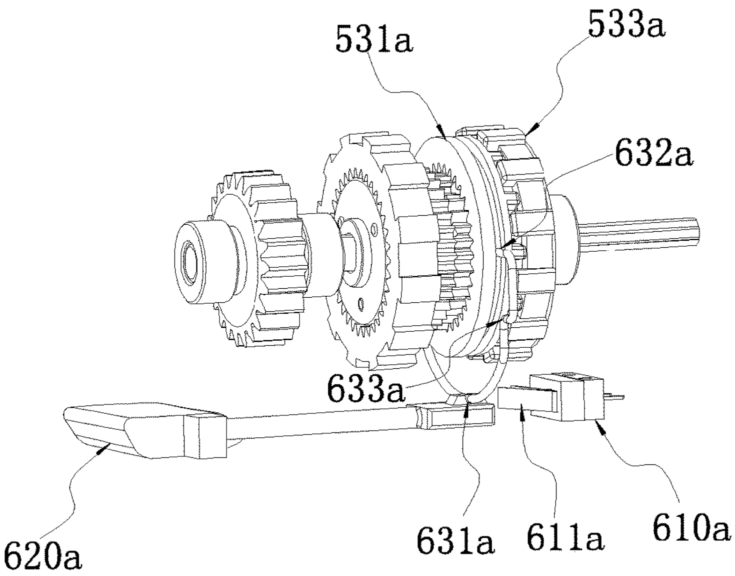
FIG. 22 is a structure view of a shift assembly of FIG. 21.

As shown in FIGS. 21 and 22, the shift assembly 530*a* is specifically a gear box and includes a housing 540*a* and a planetary gearset disposed in the housing 540*a*. In this example, the planetary gearset is disposed in the housing 540*a* around a central axis 5301*a*, and the planetary gearset includes at least one movable ring gear 531*a* and a locking member 532*a* that can be locked with the at least one movable ring gear 531*a*, where the movable ring gear 531*a* may be operated to move along a direction parallel to the central axis 5301*a* to a locking position shown in FIG. 23, and the locking member 532*a* is locked with the movable ring gear 531*a* at the locking position to limit the rotation of the movable ring gear 531*a*. In the case where the movable ring gear 531*a* is at the locking position shown in the figure, the shift assembly 530*a* is in the first transmission state, that is, the pushing rod assembly moves at a low speed.

Figure 23:
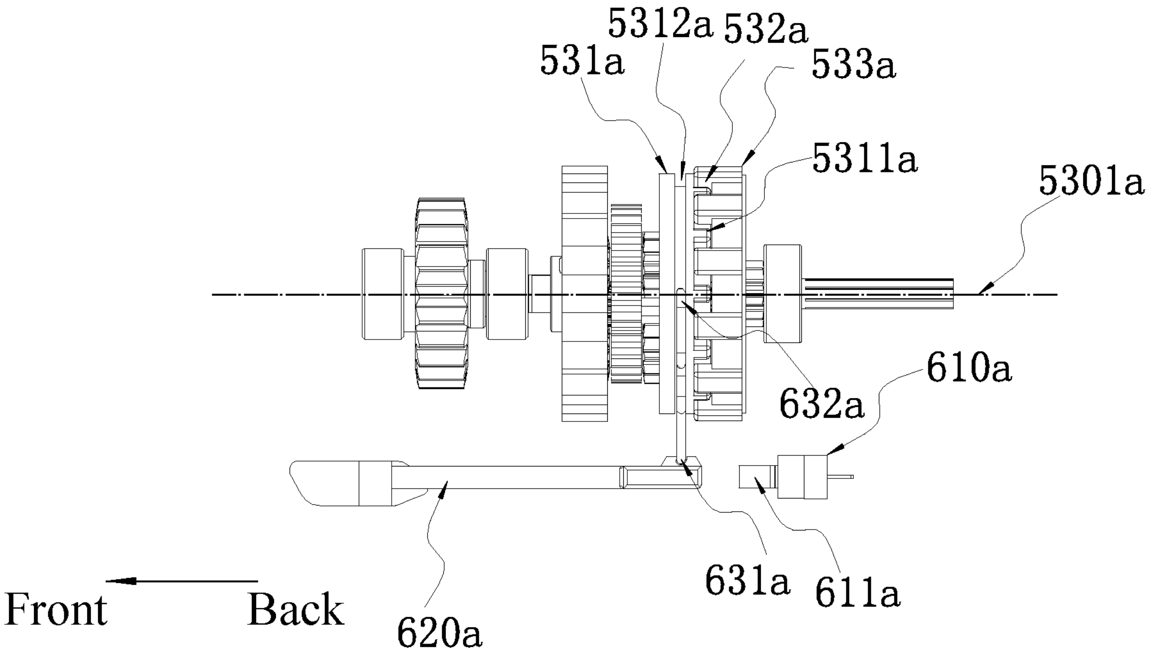
FIG. 23 is a schematic view of the shift assembly of FIG. 22 in a first transmission state.

Specifically, the planetary gearset includes a first planetary gearset, a second planetary gearset, and a third planetary gearset. As shown in FIG. 23, the first planetary gearset includes a first inner ring gear 533*a* and multiple planetary gears that are disposed in and meshed with the first inner ring gear 533*a*; the second planetary gearset includes the movable ring gear 531*a* and multiple planetary gears that are meshed with the movable ring gear 531*a*, and in other words, the movable ring gear 531*a* forms an inner ring gear of the second planetary gearset; and the third planetary gearset includes a third inner ring gear and multiple planetary gears. In this example, several tooth portions 5311*a* are provided at an axial end of the movable ring gear 531*a* closer to the first inner ring gear 533*a*; correspondingly, the locking member 532*a* includes several locking teeth formed at an axial end of the first inner ring gear 533*a* closer to the movable ring gear 531*a*; axial intervals are formed between the locking teeth, the tooth portions 5311*a* are allowed to be inserted into the axial intervals, and the tooth portions 5311*a* enter the axial intervals and are locked with the locking teeth. In this manner, the rotation of the movable ring gear 531*a* around the central axis 5301*a* is limited, that is, in the case where the movable ring gear 531*a* is at the locking position, a second inner ring gear is in a fixed state, the second planetary gearset reduces the speed, the shift assembly 530*a* is in the first transmission state, and the pushing rod assembly is operating at a low speed; after the movable ring gear 531*a* moves to the left in FIG. 23 and then is away from the locking position, the movable ring gear 531*a* and the first inner ring gear 533*a* are unlocked, the movable ring gear 531*a* is in a freely rotating state, the second planetary gearset fails and does not reduce the speed, the shift assembly 530*a* is in the second transmission state, and the pushing rod assembly is operating at a high speed.

As shown in FIGS. 21 to 23, the electric glue gun further includes a state switching mechanism configured to switch the state of the shift assembly, where the state switching mechanism includes a control switch 610*a*, an operation member 620*a*, and a switching member 630*a*, where the operation member 620*a* includes a first position and a second position that slide along the casing 110*a*, and the second position is located in front of the first position, where in FIG. 23, a left side along the axis 5301*a* is the front, and a right side along the axis 5301*a* is the back. The switching member 630*a* connects the operation member 620*a* and the movable ring gear 531*a* in the transmission manner and is configured to convert the movement of the operation member 620*a* into position switching of the movable ring gear 531*a*.

Referring to FIG. 22, the switching member 630*a* is a U-shaped bracket and includes a middle connection arm and two end arms each of which is connected to a respective side of the middle connection arm, where the middle of the middle connection arm is clamped in a clamping groove inside the operation member 620*a* so that a driven portion 631*a* is formed, and the driven portion 631*a* may move with the operation member 620*a*; end portions of the two end arms pass through the housing 540*a* separately and then are connected to the movable ring gear 531*a*. Therefore, each of free end portions of the two end arms forms a switching portion 632*a* configured to switch the position of the movable ring gear 531*a*, and the driven portion 631*a* is located between a pair of switching portions 632*a*. Each end arm is further provided with a rotation support portion 633*a*. As shown in FIG. 22, in this example, the rotation support portion 633*a* is a bent portion of the end arm or may also be a protrusion that extends from the end arm; the rotation support portion 633*a* is located between the switching portion 632*a* and the driven portion 631*a*, and the rotation support portion 633*a* is configured to be connected to the housing 540*a* in a rotation manner to support the rotation of the switching member 630*a*. Specifically, referring to FIG. 21, the housing 540*a* is provided with an opening which the switching portions 632*a* are allowed to enter, and a groove disposed in correspondence to the rotation support portions 633*a* is further provided on an outer circumferential surface of the housing 540*a*. As shown in FIG. 23, the movable ring gear 531*a* is provided with an annular groove 5312*a* which the switching portions 632*a* of the end arms are allowed to enter, the annular groove 5312*a* fits with the switching portions 632*a* of the end arms, and the annular groove 5312*a* is an annular groove that extends along an outer circumference of the movable ring gear 531*a*.

The operation member 620*a* may be operated by the user to trigger or turn off the control switch 610*a* so that the state of the control switch 610*a* is changed. In the case where the state of the control switch 610*a* changes, the control mechanism 400*a* controls the motor to change a rotation direction and the shift assembly 530*a* switches the transmission state of the shift assembly 530*a* simultaneously. The shift assembly 530*a* includes the first transmission state in which the pushing rod assembly outputs the first speed and the second transmission state in which the pushing rod assembly outputs the second speed, where the second speed is higher than the first speed.

The control switch 610*a* is a signal switch. In the case where the state of the signal switch changes, the signal switch sends a control signal to the control mechanism 400*a*, and the control mechanism 400*a* controls the motor to rotate reversely to trigger the backward movement of the pushing rod assembly. Referring to FIGS. 22 to 25, the control switch 610*a* has a triggerable trigger member 611*a* which may specifically be an elastic piece or a contact. In the present disclosure, the state change of the signal switch includes that the trigger member 611*a* changes from a freely released state to a pressed-and-triggered state or changes from being pressed to being released.

The state switching mechanism further includes a biasing member. Specifically, the biasing member is a spring and configured to exert a biasing force on the operation member 620*a*, which makes the operation member 620*a* at an original position. The original position refers to a position where the operation member 620*a* does not trigger the control switch 610*a*, that is, a position where the operation member 620*a* is not operated.

In the case where the control switch 610*a* is not operated, the movable ring gear 531*a* remains locked by the first inner ring gear 533*a*. At this time, the movable ring gear 531*a* is in a fixed state, the second planetary gearset reduces the speed, the shift assembly 530*a* is in the first transmission state, and the pushing rod assembly outputs the first speed.

As shown in FIGS. 21 to 23, in this example, the control switch 610*a* is disposed on a back side of the operation member 620*a* or may be located on a path along which the operation member 620*a* retreats. In the case where the control switch 610*a* is not operated, the movable ring gear 531*a* remains locked by the first inner ring gear 533*a*. At this time, the movable ring gear 531*a* is in the fixed state, the second planetary gearset reduces the speed, the shift assembly 530*a* is in the first transmission state, and the pushing rod assembly outputs the first speed.

In the case where the operation member 620*a* is operated to retreat and then is triggered, the control mechanism 400*a* is configured to control the motor to rotate reversely when receiving a trigger signal from the control switch 610*a*; at the same time, as the operation member 620*a* retreats, the driven portion 631*a* of the switching member 630*a* retreats with the operation member 620*a*. In this manner, the switching portions 632*a* of the switching member 630*a* move forward and the movable ring gear 531*a* is driven to move away from the first inner ring gear 533*a*. Finally, the locking of the movable ring gear 531*a* by the locking member 532*a* on the first inner ring gear 533*a* is released so that the movable ring gear 531*a* can rotate freely without decelerating, and thus the shift assembly 530*a* is switched to the second transmission state and the pushing rod assembly outputs the second speed.

The biasing member in this example exerts the biasing force on the operation member 620*a* so that the operation member 620*a* is at the original position. It is to be understood that one end of a spring forming the biasing member is fixedly connected to the casing and the other end is fixedly connected to the operation member 620*a*, where the operation member 620*a* includes the first position that is located in the front (the left side in FIG. 23) and the second position that is located in the back (the right side in FIG. 23), and the original position in this example refers to that the operation member 620*a* is located at the first position, that is, the first position where the operation member 620*a* is not operated in FIG. 23.

As shown in FIGS. 19 and 23, in this example, the operation member 620*a* is a toggle button that can toggle forward and backward along the side of the casing 110*a*, the control switch 610*a* is the signal switch, the signal switch has the triggerable trigger member 611*a*, and the operation member 620*a* is configured to directly trigger the control switch 610*a* during movement. The operation member may also move to trigger the control switch 610*a* in a linkage manner through other linkage mechanisms such as a connection rod mechanism.

Figure 24:
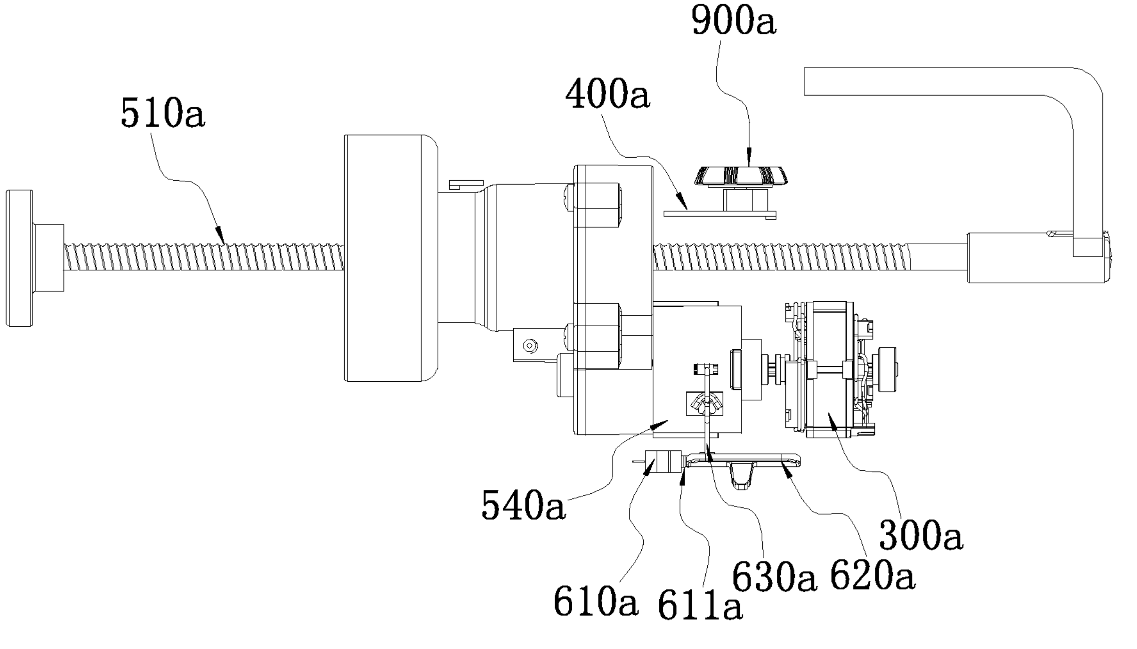
FIG. 24 is a schematic view illustrating that a transmission mechanism fits with a state switching mechanism according to another example of the present disclosure.
Figure 25:
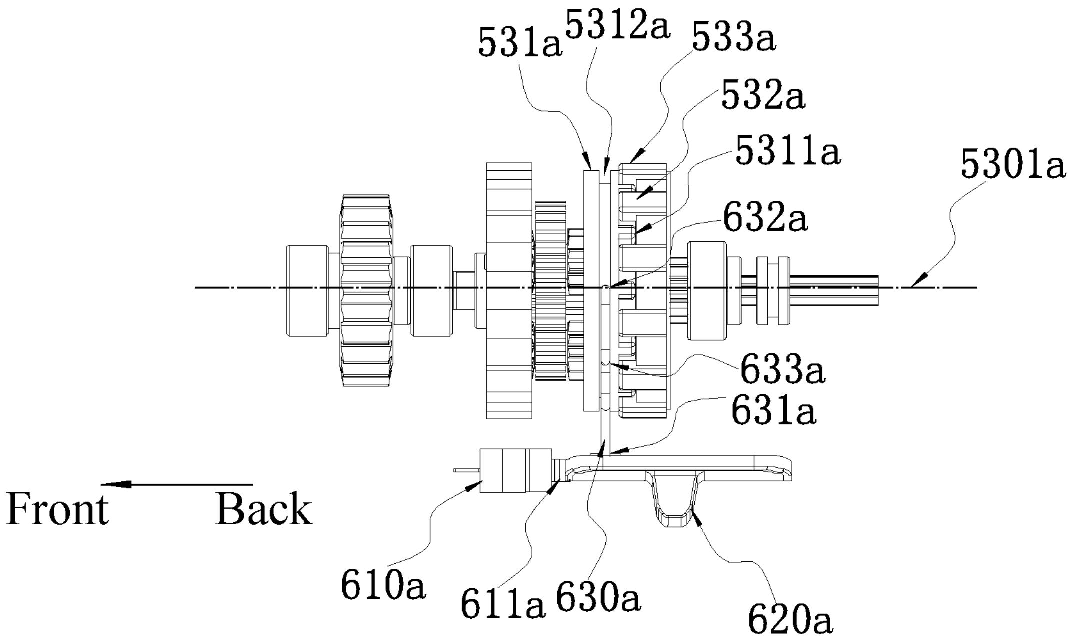
FIG. 25 is a schematic view of a shift assembly of FIG. 24 in a first transmission state.

As shown in FIGS. 24 and 25, in another alternative example, the control switch 610*a* is disposed on a front side of the operation member 620*a* or disposed on a path along which the operation member 620*a* moves forward. In this example, the operation member 620*a* is a toggle button that can toggle forward and backward along a bottom of the casing 110*a*. Similarly, in the case where the operation member 620*a* is operated to retreat and turn off the control switch 610*a*, the control mechanism 400*a* is configured to control the motor to rotate reversely when receiving a signal that the control switch 610*a* is released; at the same time, as the operation member 620*a* retreats, the driven portion 631*a* of the switching member 630*a* retreats with the operation member 620*a*. In this manner, the switching portions 632*a* of the switching member 630*a* move forward and the movable ring gear 531*a* is driven to move away from the first inner ring gear 533*a*. Finally, the locking of the movable ring gear 531*a* by the locking member 532*a* on the first inner ring gear 533*a* is released so that the movable ring gear 531*a* can rotate freely without decelerating, and thus the shift assembly 530*a* is switched to the second transmission state and the pushing rod assembly outputs the second speed.

In this example, the motor has a maximum rotation speed. In the case where the leadscrew moves forward, a speed at which the leadscrew moves forward is configured to be less than the maximum rotation speed; in the case where the leadscrew moves backward, the leadscrew is configured to move forward at the maximum rotation speed. For example, the maximum rotation speed of the motor is 25000 RPM, the rotation speed of the motor may be configured to be 10000 RPM in the case where the leadscrew moves forward, and the rotation speed of the motor may be configured to be 25000 RPM in the case where the leadscrew moves backward. The preceding data is only an example, and the rotation speed of the motor is not limited to the preceding range.

The biasing member in this example exerts the biasing force on the operation member 620*a* so that the operation member 620*a* is at the original position. It is to be understood that one end of the spring forming the biasing member is fixedly connected to the casing and the other end is fixedly connected to the operation member 620*a*, where the operation member 620*a* includes the first position that is located in the front and the second position that is located in the back, and the original position in this example refers to that the operation member 620*a* is located at the second position where the operation member 620*a* is located in the back and does not move forward to trigger the control switch 610*a*, and the operation member 620*a* is located at the first position in FIG. 25.

Referring to FIG. 20, the electric glue gun in the examples of the present disclosure further includes a battery pack 800*a* and a switch assembly 910, where the battery pack 800*a* is configured to provide power for the motor. The switch assembly 910 in the examples of the present disclosure is a knob switch, the switch assembly 910 is connected to the power mechanism 300*a* through the control mechanism 400*a*, and a knob may control the power mechanism 300*a* to be on or off through the control mechanism 400*a*.

Figure 26:
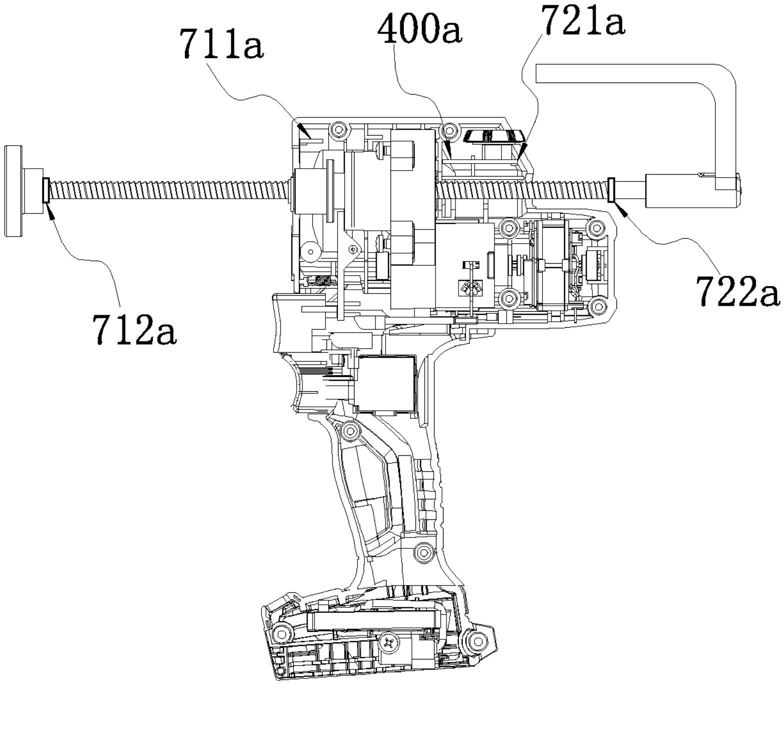
FIG. 26 is a structure view of a limiting mechanism according to the present disclosure.

As shown in FIG. 26, the electric glue gun of the present disclosure further includes a limiting mechanism, where the limiting mechanism is electrically connected to the control mechanism to limit an extreme position for advancement and an extreme position for retreat of the pushing rod assembly and prevent excessive advancement or excessive retreat of the pushing rod assembly, and the limiting mechanism includes a first limiting assembly and a second limiting assembly.

Specifically, referring to FIG. 26, the first limiting assembly is configured to limit the extreme position for retreat of the pushing rod assembly, and the first limiting assembly includes a first Hall element 711*a* and a first magnetic member 712*a*. The first Hall element 711*a* is a first Hall plate that is disposed at the front end of the casing 110*a* and electrically connected to the control mechanism 400*a*, and the first magnetic member 712*a* is disposed at a front end of the pushing rod assembly, where the first magnetic member 712*a* may be a magnetic ring that is sleeved on the leadscrew 510*a* or a magnetic block that is embedded in the leadscrew 510*a*.

The second limiting assembly is configured to limit the extreme position for advancement of the pushing rod assembly, and the second limiting assembly includes a second Hall element 721*a* and a second magnetic member 722*a*. The second Hall element 721*a* is disposed at a back end of the casing 110*a* and electrically connected to the control mechanism 400*a*. In this example, the second Hall element 721*a* is directly disposed on the control mechanism 400*a*. A Hall plate electrically connected to the control mechanism 400*a* may also be separately provided. The second magnetic member 722*a* is disposed at a back end of the pushing rod assembly, where the second magnetic member 722*a* may also be a magnetic ring that is sleeved on the leadscrew 510*a* or a magnetic block that is embedded in the leadscrew 510*a*.

In the case where the leadscrew 510*a* retreats until the first magnetic member 712*a* is close to the first Hall element 711*a*, the first Hall element 711*a* sends a detection signal to the control mechanism 400*a*; in the case where the detection signal reaches a first preset threshold, it is regarded as reaching the extreme position for retreat, and the control mechanism 400*a* controls the motor to stop rotating so that the leadscrew 510*a* is prevented from excessive retreat. Similarly, in the case where the leadscrew 510*a* advances until the second magnetic member 722*a* is close to the second Hall element 721*a*, the second Hall element 721*a* sends a detection signal to the control mechanism 400*a*; in the case where the detection signal reaches a second preset threshold, it is regarded as reaching the extreme position for advancement, and the control mechanism 400*a* controls the motor to stop rotating so that the leadscrew 510*a* is prevented from excessive advancement.

In the electric glue gun of the present disclosure, the operation member is operated to control the motor to rotate reversely and control the shift assembly to switch its state simultaneously. In other words, the behavior of operating the operation member 620*a* can simultaneously change the movement direction and switch the speed of the pushing rod assembly. The electric glue gun is simple to operate and reasonable in setting, low-speed gluing and high-speed retreat are achieved, and not only the normal gluing requirement can be satisfied but also the pushing rod assembly can be reset quickly when not working, which is conducive to improving the user experience.

As another example of the present disclosure, the switching member 630*a* and the shift assembly 530*a* may not be provided. In this case, the shift assembly adopts a control circuit board, and the control circuit board configured to regulate the speed may be configured as one module in the control mechanism, or an independent control circuit board that is electrically connected to the control mechanism may be provided separately. Similarly, the operation member 620*a* and the control switch 610*a* may be provided, the operation of the operation member 620*a* can change the state of the control switch 610*a*, the control switch 610*a* sends a control signal for regulating the speed in the case where the state of the control switch 610*a* changes, and the control mechanism controls the motor to change the rotation direction and the rotation speed, where the state change refers to a change from being released to being pressed or from being pressed to being released. In this example, there is no need to change the structure, and the rotation direction and the rotation speed of the motor can be changed through a speed regulation motor and a speed regulation control circuit. However, since a speed regulation gear box is not provided, the speed regulation range of the output speed of the pushing rod assembly in this manner is less than the speed regulation range in the preceding two examples, that is, the speed can only be regulated within the range of allowed rotation speeds of the motor.

The above illustrates and describes basic principles, main features, and advantages of the present disclosure. It is to be understood by those skilled in the art that the preceding examples do not limit the present disclosure in any form, and technical solutions obtained by means of equivalent substitution or equivalent transformation fall within the protection scope of the appended claims.

What is claimed is:

1. A power tool, comprising:

a casing;

an output mechanism disposed at a front end of the casing;

a motor configured to provide power for the output mechanism;

a leadscrew extending along a front-and-back direction and connected to the output mechanism;

a rotation assembly connected to the motor and driven by the motor to rotate around the leadscrew;

a radial transmission assembly driven by the rotation assembly to rotate;

an axial transmission assembly separately connected to the radial transmission assembly and the leadscrew in a rotation manner and configured to drive the leadscrew to move along an axial direction of the leadscrew; and a torque transmission portion disposed between the radial transmission assembly and the axial transmission assembly and configured to transmit torque and cause the axial transmission assembly and the radial transmission assembly to rotate synchronously, wherein the radial transmission assembly comprises a first transmission sleeve and transmission teeth connected to the rotation assembly, the radial transmission assembly is disposed on a radially outer side of the first transmission sleeve, and the torque transmission portion comprises a first torque transmission portion disposed between the first transmission sleeve and the axial transmission assembly and configured to cause the first transmission sleeve and the axial transmission assembly to rotate synchronously, wherein the first torque transmission portion comprises several first non-circular portions disposed on an inner circumference of the first transmission sleeve and several second non-circular portions disposed on an outer circumference of the axial transmission assembly and the several second non-circular portions fit with the several first non-circular portions, wherein the axial transmission assembly comprises a ball rack and balls, the ball rack is connected to the first transmission sleeve in the transmission manner and sleeved on an outer circumference of the leadscrew, and a rack wall of the ball rack is provided with through holes through which the balls are allowed to pass, and wherein the radial transmission assembly further comprises a second transmission sleeve, the second transmission sleeve is sleeved on an outer circumference of the ball rack and provided with retention grooves on an inner circumferential wall of the second transmission sleeve, and the balls are allowed to enter the retention grooves.

2. The power tool of claim 1, wherein the torque transmission portion further comprises a second torque transmission portion disposed between the second transmission sleeve and the axial transmission assembly and configured to cause the second transmission sleeve and the axial transmission assembly to rotate synchronously.

3. The power tool of claim 2, wherein the second torque transmission portion comprises an anti-rotation pin, an installation hole disposed on the second transmission sleeve, and a pin groove disposed on the ball rack, and the pin groove extends along an axial direction of the ball rack.

4. The power tool of claim 1, wherein the second transmission sleeve is further provided with third non-circular portions on an outer circumference of the second transmission and the third non-circular portions fit with the several first non-circular portions so that rotation of the second transmission sleeve relative to the first transmission sleeve is limited.

5. The power tool of claim 4, wherein each of the several first non-circular portions is a first plane disposed on the inner circumference of the first transmission sleeve, each of the several second non-circular portions is a second plane disposed on the outer circumference of the ball rack, and each of the third non-circular portions is a third plane disposed on the outer circumference of the second transmission sleeve.

6. The power tool of claim 1, wherein the rotation assembly comprises a driving gear and a sleeve, the driving gear is disposed coaxially with the sleeve, the driving gear is connected to the motor in the transmission manner, and the sleeve is provided with transmission holes into which the transmission teeth are inserted.

7. The power tool of claim 1, further comprising a clutch mechanism wherein the clutch mechanism is configured to drive the axial transmission assembly to move to a clutch position, and, in a case where the axial transmission assembly is located at the clutch position, the balls are disengaged from the leadscrew.

8. The power tool of claim 7, wherein the clutch mechanism comprises a movement assembly and a connection assembly, the connection assembly is connected to the ball rack, the movement assembly is sleeved on the second transmission sleeve, and the movement assembly is configured to drive the connection assembly to drive the ball rack to move axially.

9. The power tool of claim 8, wherein the clutch mechanism further comprises a trigger assembly and the trigger assembly is configured to drive the movement assembly to move to the clutch position.

10. The power tool of claim 9, wherein the trigger assembly is a shift lever or a shift fork, the shift lever or the shift fork is pivotally connected to the casing, and the connection assembly is an insertion piece that is clamped at an axial end of the ball rack.

11. A power tool, comprising:

a casing;

an output mechanism disposed at a front end of the casing;

a motor configured to provide power for the output mechanism;

a leadscrew extending along a front-and-back direction and connected to the output mechanism;

a rotation assembly connected to the motor and driven by the motor to rotate around the leadscrew;

a radial transmission assembly driven by the rotation assembly to rotate;

an axial transmission assembly separately connected to the radial transmission assembly and the leadscrew in a rotation manner and configured to drive the leadscrew to move along an axial direction of the leadscrew; and a torque transmission portion disposed between the radial transmission assembly and the axial transmission assembly and configured to transmit torque and cause the axial transmission assembly and the radial transmission assembly to rotate synchronously, wherein the output mechanism is a glue cylinder and the power tool is a glue gun, and further comprising an operation handle disposed at a back end of the leadscrew.

12. A power tool, comprising:

a casing;

an output mechanism disposed at a front end of the casing;

a motor configured to provide power for the output mechanism;

a leadscrew extending along a front-and-back direction and connected to the output mechanism;

a rotation assembly connected to the motor and driven by the motor to rotate around the leadscrew;

a radial transmission assembly driven by the rotation assembly to rotate;

an axial transmission assembly separately connected to the radial transmission assembly and the leadscrew in a rotation manner and configured to drive the leadscrew to move along an axial direction of the leadscrew; and a torque transmission portion disposed between the radial transmission assembly and the axial transmission assembly and configured to transmit torque and cause the axial transmission assembly and the radial transmission assembly to rotate synchronously, wherein the output mechanism comprises a container and a piston movable in the container, the power tool further comprises an anti-failure mechanism detachably connected to the piston, the anti-failure mechanism comprises a cleaning tooth, and, in a case where the anti-failure mechanism moves relative to the leadscrew, the cleaning tooth removes a residual adhesive on the leadscrew.

13. The power tool of claim 12, wherein the cleaning tooth is capable of being inserted into a thread root formed on the leadscrew.

14. The power tool of claim 12, wherein the anti-failure mechanism comprises a plurality of cleaning teeth, wherein the plurality of cleaning teeth are arranged at intervals along the axial direction of the leadscrew.

15. The power tool of claim 12, wherein the anti-failure mechanism comprises a plurality of cleaning teeth and the plurality of cleaning teeth are spirally arranged at intervals on a cleaning member.

* * * * *